US012754871B2

(12) United States Patent
Harada

(10) Patent No.: US 12,754,871 B2
(45) Date of Patent: Oct. 6, 2026

(54) SLAVE DEVICE, COMMUNICATION SYSTEM, IMAGING DEVICE, MASTER DEVICE, AND DATA COMMUNICATION METHOD

(71) Applicant: Asahi Kasei Microdevices Corporation, Tokyo (JP)

(72) Inventor: Yusuke Harada, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 9 days.

(21) Appl. No.: 18/896,863

(22) Filed: Sep. 25, 2024

(65) Prior Publication Data

US 2025/0103543 A1 Mar. 27, 2025

(30) Foreign Application Priority Data

Sep. 27, 2023 (JP) ................................ 2023-165935

(51) Int. Cl.
*G06F 13/42* (2006.01)
*G06F 13/14* (2006.01)

(52) U.S. Cl.
CPC .. *G06F 13/4282* (2013.01); *G06F 2213/0016* (2013.01)

(58) Field of Classification Search
CPC ......... G06F 13/4282; G06F 2213/0016; G06F 13/14
See application file for complete search history.

(56) References Cited

U.S. PATENT DOCUMENTS

| | | | | |
|---|---|---|---|---|
| 5,404,476 A * | 4/1995 | Kadaira | G06F 12/1036 | 711/208 |
| 10,783,101 B1 | 9/2020 | Kamiya | | |
| 2003/0149824 A1 | 8/2003 | Smith | | |
| 2005/0078614 A1* | 4/2005 | Haartsen | H04B 1/7156 | 370/260 |
| 2013/0297829 A1* | 11/2013 | Berenbaum | G06F 13/4256 | 710/36 |
| 2015/0227480 A1* | 8/2015 | Whitaker | G06F 13/364 | 710/110 |

(Continued)

FOREIGN PATENT DOCUMENTS

| | | |
|---|---|---|
| WO | 0225449 A2 | 3/2002 |
| WO | 2014083707 A1 | 6/2014 |
| WO | 2019244410 A1 | 12/2019 |

*Primary Examiner* — Idriss N Alrobaye
*Assistant Examiner* — Henry W Yu

(57) ABSTRACT

Provided is a slave device that performs data communication with a master device via a bus. The slave device includes: an ID storage unit that stores an ID; and a communication unit that receives a control signal, including address information indicating a common address for the plurality of slave devices, specifying information specifying at least one slave device targeted for data communication, and data length information, and, in response to the specifying information in which its own slave device is not selected, determines not to communicate with the master device, and, in response to the specifying information in which its own slave device is selected, decides an order of the slave device to read or write data with a data length indicated in the data length information from/to a register of the slave device according to the ID and the specifying information.

20 Claims, 18 Drawing Sheets

(56) References Cited

U.S. PATENT DOCUMENTS

| | | | |
|---|---|---|---|
| 2016/0314087 | A1 | 10/2016 | Poulsen |
| 2017/0046292 | A1* | 2/2017 | Teuke ............... H04L 12/40169 |
| 2019/0108149 | A1* | 4/2019 | Graif .................. G06F 13/4291 |
| 2019/0188165 | A1 | 6/2019 | Venkatraman |
| 2023/0079571 | A1 | 3/2023 | Okada |

* cited by examiner

| ADDRESS BIT | IC TO BE SELECTED |
|---|---|
| ADRS[7] | IC1 |
| ADRS[6] | IC2 |
| ADRS[5] | IC3 & IC4 |
| ADRS[4] | IC5 & IC6 |

*FIG.11*

| ADRS[3:0] | REGISTER | DATA LENGTH |
|---|---|---|
| 0 | Position0 | 1 BYTE |
| 1 | Position1 | 1 BYTE |
| 2 | Position0/1 | 2 BYTE |
| 3 | XXX read1 | 1 BYTE |
| 4 | XXX read2 | 1 BYTE |
| 5 | XXX read1/2 | 2 BYTE |
| 6 | OPERATION COMMAND | 1 BYTE |
| 7 | ... | ... |
| 8 | ... | ... |
| 9 | ... | ... |
| 10 | ... | ... |
| 11 | ... | ... |
| 12 | ... | ... |
| 13 | ... | ... |
| 14 | ... | ... |
| 15 | ... | ... |

*FIG.12*

SLAVE DEVICE, COMMUNICATION SYSTEM, IMAGING DEVICE, MASTER DEVICE, AND DATA COMMUNICATION METHOD

The contents of the following patent application(s) are incorporated herein by reference:

NO. 2023-165935 filed in JP on Sep. 27, 2023

BACKGROUND

1. Technical Field

The present invention relates to a slave device, a communication system, an imaging device, a master device, and a data communication method.

2. Related Art

Patent Document 1 discloses an I2C communication device that allows change in addresses. Patent Document 2 discloses a communication device that manages a slave device in which a plug-in module is added to a platform. Patent Document 3 discloses a method with which a plurality of integrated circuits in communication with a host provides a register that stores unique slave addresses, global addresses, and sequence numbers. Patent Document 4 discloses a method for communicating by adding a virtual device address to a plurality of devices as a global device.

PRIOR ART DOCUMENT

Patent Document

Patent Document 1: Japanese translation publication of a PCT rout patent application No. 2004-510228

Patent Document 2: WO2014/083707 brochure

Patent Document 3: China Patent Application Publication No. 112148656 specification Patent Document 4: U.S. Patent Application Publication No. 2016/0314087 specification

BRIEF DESCRIPTION OF THE DRAWINGS

FIG. 11 is a diagram for showing an example of a reference table showing the combination of the slave devices 32 (IC chips) targeted for control according to an embodiment.

FIG. 12 is a diagram showing an example of a control map according to an embodiment.

DESCRIPTION OF EXEMPLARY EMBODIMENTS

Hereinafter, embodiments of the present invention will be described. However, the following embodiments are not for limiting the invention according to the claims. In addition, not all of the combinations of features described in the embodiments are essential to the solution of the invention.

Figure 1:
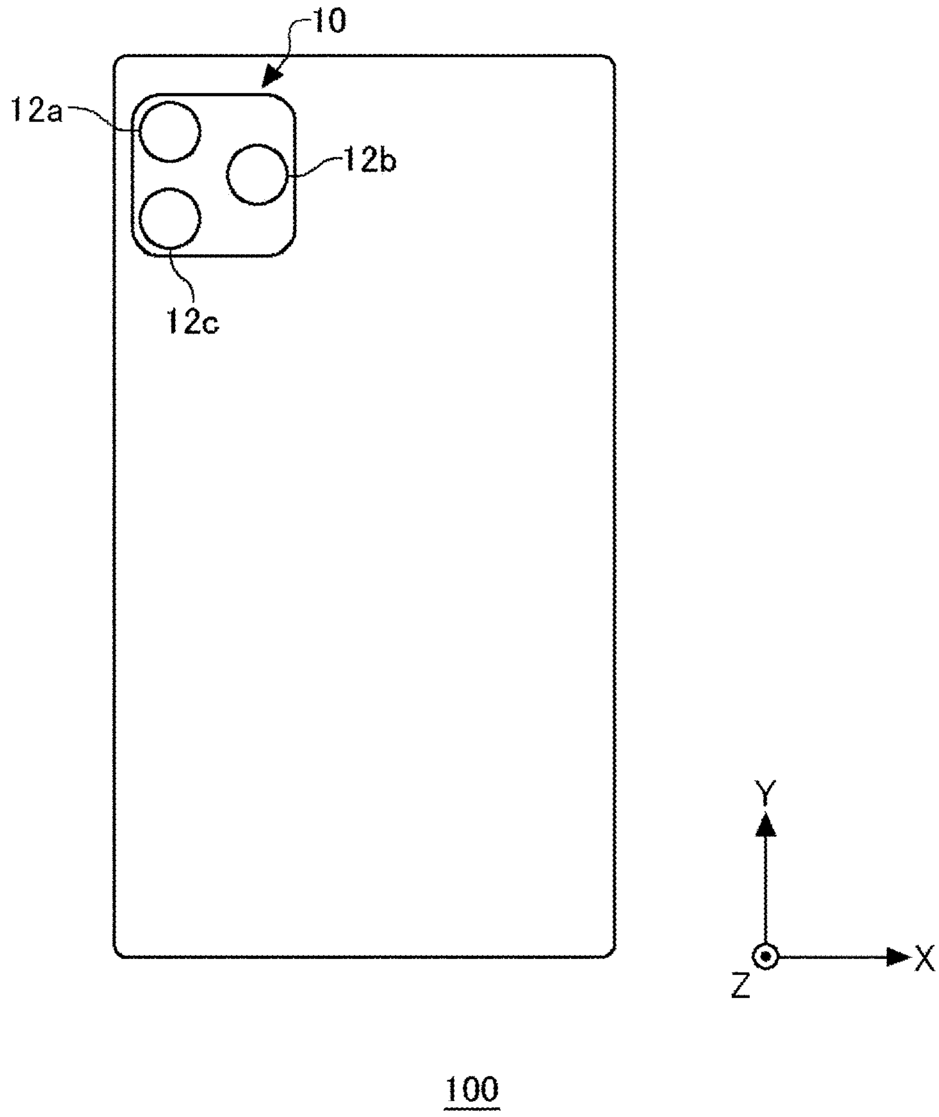
FIG. 1 is a diagram showing an example of a schematic view of a user terminal 100 having an imaging device 10 including a plurality of cameras 12*a*-12*c*.

FIG. 1 is a diagram showing an example of a schematic view of a user terminal 100 having an imaging device 10 including a plurality of cameras 12*a*-12*c*. In the present specification, a plurality of cameras 12*a*-12*c* and the like are sometimes collectively referred to as a plurality of cameras 12, a camera 12, or the like.

In an example, the user terminal 100 is a device including an imaging device 10 incorporated into a smartphone, a tablet, a laptop PC, a compact PC, or the like. In another example, the user terminal 100 may be a device including an imaging device 10 for taking a video. such as a digital camera, a Web camera, a video camera, or the like.

The plurality of cameras 12 have an optical system with different focal lengths and angles of view. The imaging range of each of the plurality of cameras 12 overlaps with each other. Here, the camera 12*a* is an ultra wide angle camera having an optical system in which the focal length is equal to or more than 13 mm and less than 16 mm, the f value is equal to or more than 2.2 and less than 2.6, and the angle of view is equal to or more than 110° and less than 130°, for example. The camera 12*b* is a wide angle camera (main camera) having an optical system in which the focal length is equal to or more than 22 mm and less than 30 mm and the f value is equal to or more than 1.5 and less than 2.0, for example. The camera 12*c* is a telephotographic camera having an optical system in which the focal length is equal to or more than 50 mm and less than 150 mm and the f value is equal to or more than 2.2 and less than 4.0, for example.

The imaging device 10 may output one image by synthesizing the image captured by at least two cameras 12 among the plurality of cameras 12.

The camera 12 has an image stabilization function. The camera 12 may have an optical image stabilization (OIS) function. The control for an optical system of the camera 12 in the OIS function is detailed with reference to FIG. 2.

The number of the cameras 12 shown in FIG. 1 is just an example and the number of the cameras 12 is not limited to three and may be less than three or may be equal to or more than four. In this case, for example, the imaging ranges of two or more cameras 12 may overlap, the imaging ranges of three cameras 12 may overlap, or the imaging ranges of four or more cameras 12 may overlap. The imaging device 10 only needs to include at least one camera 12.

Here, the X-axis may be in the direction that is on the plane perpendicular to the optical axis (Z-axis) of the optical system of each of the plurality of cameras 12 and in which one of the edges of the user terminal 100 extends. The Y-axis may be in the direction that is on the plane perpendicular to the optical axis among the front surface or back surface of the user terminal 100 and that is perpendicular to the X-axis and forms the right-handed coordinate system to the positive direction of the X-axis. The Z-axis may be in the direction that intersects the X-Y plane such that the X-axis, the Y-axis, and the Z-axis form the right-handed coordinate system.

Figure 2:
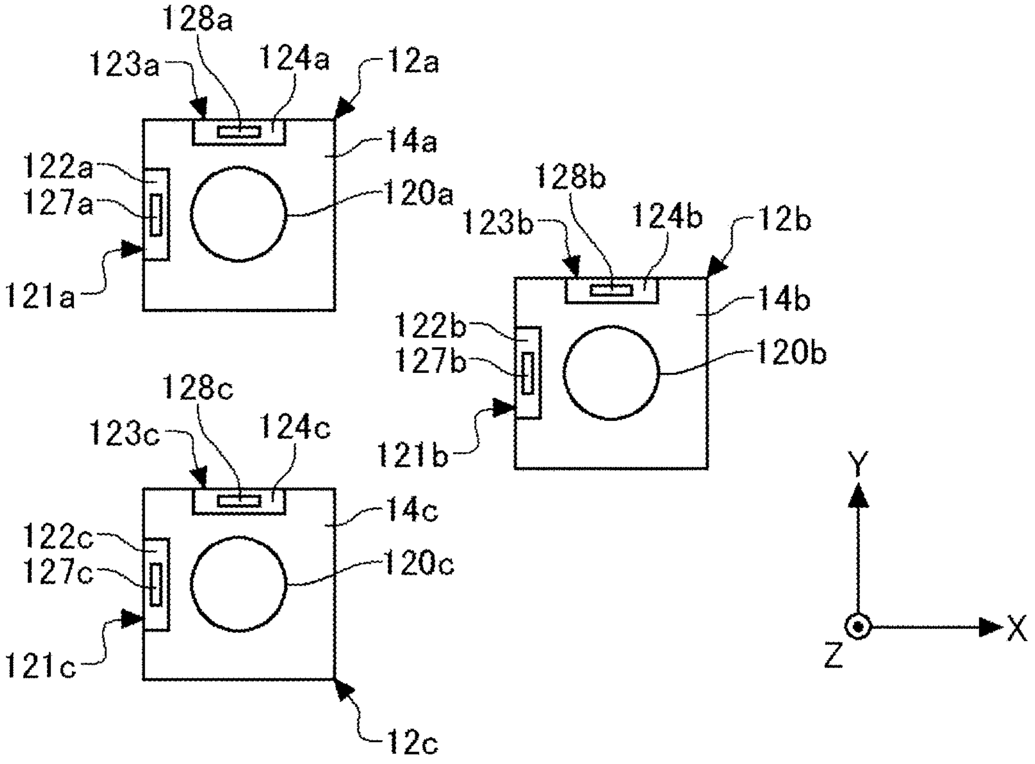
FIG. 2 is a diagram showing an example of a configuration of the cameras 12*a*-12*c*.

FIG. 2 is a diagram showing an example of a configuration of the cameras 12*a*-12C. The camera 12*a* includes an optical system 120*a*, voice coil motors 121*a* and 123*a*, and IC chips 127*a* and 128*a*. The camera 12*b* includes an optical system 120*b*, voice coil motors 121*b* and 123*b*, and IC chips 127*b* and 128*b*. The camera 12*c* includes an optical system 120*c*, voice coil motors 121*c* and 123*c*, and IC chips 127*c* and 128*c*. The optical systems 120*a*-120*c* include a plurality of lenses. The plurality of lenses may function as at least one of a zoom lens, a varifocal lens, or a focus lens.

The voice coil motors 121*a*-121*c* and 123*a*-123*c* are drive mechanisms that drive the optical systems 120*a*-120*c* along the X-axis and the Y-axis, which are two orthogonal axes on the plane perpendicular to the optical axis so as to achieve the OIS. The voice coil motors 121*a*-121*c* and 123*a*-123*c* include air core coils 122*a*-122C, air core coils 124*a*-124C, and magnets that pair with each of the air core coils. The IC chips 127*a*-127*c* and the IC chips 128*a*-128*c* may be arranged in the air core portions of the air core coils 122*a*-122C and the air core coils 124*a*-124C, respectively. In the present specification, the voice coil motors 121*a*-121*c* and 123*a*-123*c* are sometimes collectively referred to as a plurality of voice coil motors 121 and 123, voice coil motors 121 and 123, or the like. In addition, the air core coils 122*a*-122C and the air core coils 124*a*-124C are sometimes collectively referred to as a plurality of air core coils 122 and 124 or the air core coils 122 and 124 or the like. The IC chips 127*a*-127*c* and the IC chips 128*a*-128*c* are sometimes collectively referred to as a plurality of IC chips 127 and 128, the IC chips 127 and 128 or the like.

For example, the magnets are provided in the holding frames that hold the optical systems 120*a*-120*c* and the air core coils 122*a*-122C and 124*a*-124C are provided in the bases 14*a*-14*c*, sometimes collectively referred to as the base 14, which support the holding frame on the X-Y plane in a movable manner. When the IC chips 127 and 128 apply a current to pass through the air core coils 122 and 124, a force is generated in the air core coils 122 and 124 in a direction perpendicular to the magnetic field, moving the holding frame relative to the base 14. In this way, the OIS is achieved.

The cameras 12*a*-12*c* drive at least one of the voice coil motors 121 or 123 to move the optical systems 120*a*-120*c* in the direction canceling the image shake.

As described above, each of the plurality of cameras 12 includes the IC chips 127 and 128 for controlling the voice coil motors 121 and 123. Therefore, as the number of the camera 12 included in the imaging device 10 increases, the number of the IC chips 127 and 128 increases.

Here, the imaging device 10 artificially generates one image with a deep depth of field by synthesizing two images captured by two cameras with different focusing positions (for example, the combination of the cameras 12*a* and 12*b*, the cameras 12*b* and 12C, or the cameras 12*c* and the camera 12*a*). In this case, the OIS is performed by the two cameras 12 by controlling the voice coil motors 121 and 123 via the IC chips 127 and 128 to drive the optical system 120.

Specifically, the OIS is performed by the ultra-wide angle camera 12*a* and the wide angle camera 12*b* by applying currents to pass through the voice coil motors 121 and 123 via the respective IC chips 127 and 129 to drive the respective optical systems 120*a* and 120*b*, within a control range in a first imaging condition. In addition, the OIS is performed by the wide angle camera 12*b* and the telephotographic camera 12*c* by applying currents to pass through the voice coil motors 121 and 123 via the respective IC chips 127 and 128 to drive the respective optical systems 120*b* and 120*c*, within a control range in a second imaging condition. In other words, since two IC chips 127 and 128 control two voice coil motors 121 and 123 for one camera 12, four IC chips 127 and 128 are sometimes controlled at a time in this example.

Figure 3:
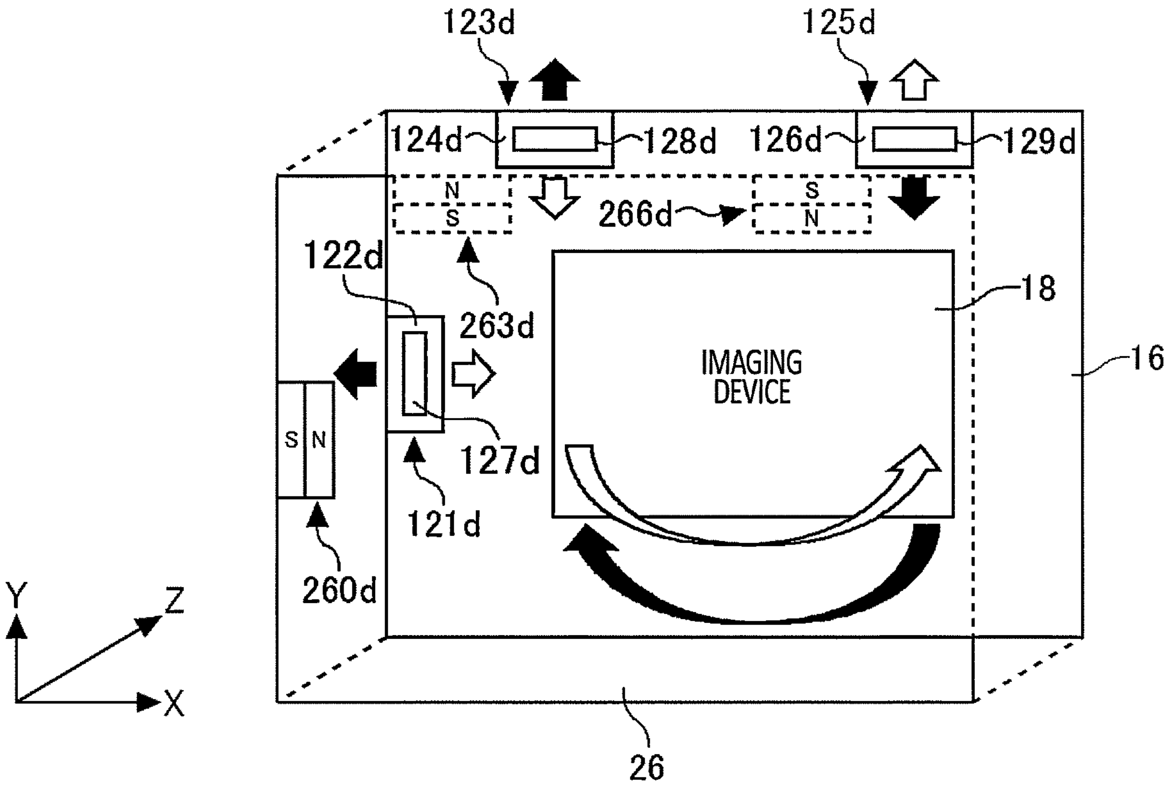
FIG. 3 is a diagram showing an example of a configuration of substrates 16 and 26.

FIG. 3 is a diagram showing an example of a configuration of the substrates 16 and 26. The substrate 16 may be supported on the substrate 26 via an elastic body, such as a spring, or a ball and a rail, and the like in a movable or rotatable manner along the X-Y plane relative to the substrate 26. On the other hand, the substrate 26 may be fixed to an enclosure of the imaging device 10 or the like. The substrate 16 has the image sensor 18 and the air core coils 122*d*, 124*d*, and 126*d* that constitute the voice coil motors 121*d*, 123*d*, and 125*d* for achieving the intra-body image stabilization (BIS), in other words, the sensor shift optical image stabilization. In addition, the substrate 16 includes a position sensor to detect the position of the substrate 16. The imaging device 10 includes the image sensor 18 that forms an image via the optical system 120.

The substrate 26 is a substrate arranged in the Z-axis direction (the depth direction) relative to the substrate 16 in the X-Y-Z space. A magnet 260*d*, a magnet 263*d*, and a magnet 266*d* are arranged on the substrate 26. The voice coil motors 121*d*, 123*d*, and 125*d* are comprised of the air core coils 122*d*, 124*d*, and 126*d* and the magnets 260*d*, 263*d*, and 266*d*. The substrate 26 includes the magnets 260*d*, 263*d*, and 266*d* at the positions opposing the air core coils 122*d*, 124*d*, and 126*d*. In the present embodiment, the substrate 16 has the air core coils 122*d*, 124*d*, and 126*d*, and the substrate 26 has the magnets 260*d*, 263*d*, and 266*d*. However, this is only an example and the substrate 16 may have the magnets 260*d*, 263*d*, and 266*d* and the substrate 26 may have the air core coils 122*d*, 124*d*, and 126*d*.

The substrate 16 includes the air core coil 122*d*, the air core coil 124*d*, the air core coil 126*d*, and the IC chip 127*d*, the IC chip 128*d*, and the IC chip 129*d* on one surface (in the example in the figure, the surface on the negative side of the Z-axis direction). The IC chips 127*d*, 128*d*, and 129*d* may be arranged on the air core portions of the air core coils 122*d*, 124*d*, and 126*d*, respectively.

The voice coil motors 123*d* and 125*d* are the drive mechanisms that apply force to the substrate 16 in the Y-axis direction. The voice coil motor 121*d* is the drive mechanism that applies force to the substrate 16 in the X-axis direction. When the voice coil motors 123*d* and 125*d* drive to apply force to the substrate 16 in the opposite directions along the Y-axis direction (the combination of the white arrows or the combination of the black arrows in the diagram), the substrate 16 can be rotated.

Therefore, the BIS is achieved by driving each of the voice coil motors 123*d*, 125*d*, and 121*d* to perform at least one of rotation or translation (shift) of the substrate 16 relative to the optical system 120. In other words, for the substrate 16 to perform the control of the BIS, the control of the three IC chips 127*d*, 128*d*, and 129*d* are performed.

At least one camera among the cameras 12*a*-12*c* may include such substrates 16 and 26. In this way, at least one camera can have a function of both the OIS and BIS.

Alternatively, at least one camera among the cameras 12*a*-12*c* may not include the voice coil motors 121 and 123 (any of the corresponding voice coil motors 121*a*-121*c* and 123*a*-123*c*) that drive the optical system 120 but include the substrates 16 and 26. Therefore, it may include the voice coil motors 123*d*, 125*d*, and 121*d* that drive the substrate 16 on which the image sensor 18 is mounted. In other words, at least one camera may not have the OIS function but only have the BIS function.

The OIS or BIS may be achieved by further moving the optical systems 120*a*-120*c* or the image sensor 18 arranged on the substrate 16 in the Z-axis direction. In this case, a drive mechanism such as a further voice coil motor is provided, but the control in the Z-axis direction is not detailed in the present specification for brevity of description.

Figure 4:
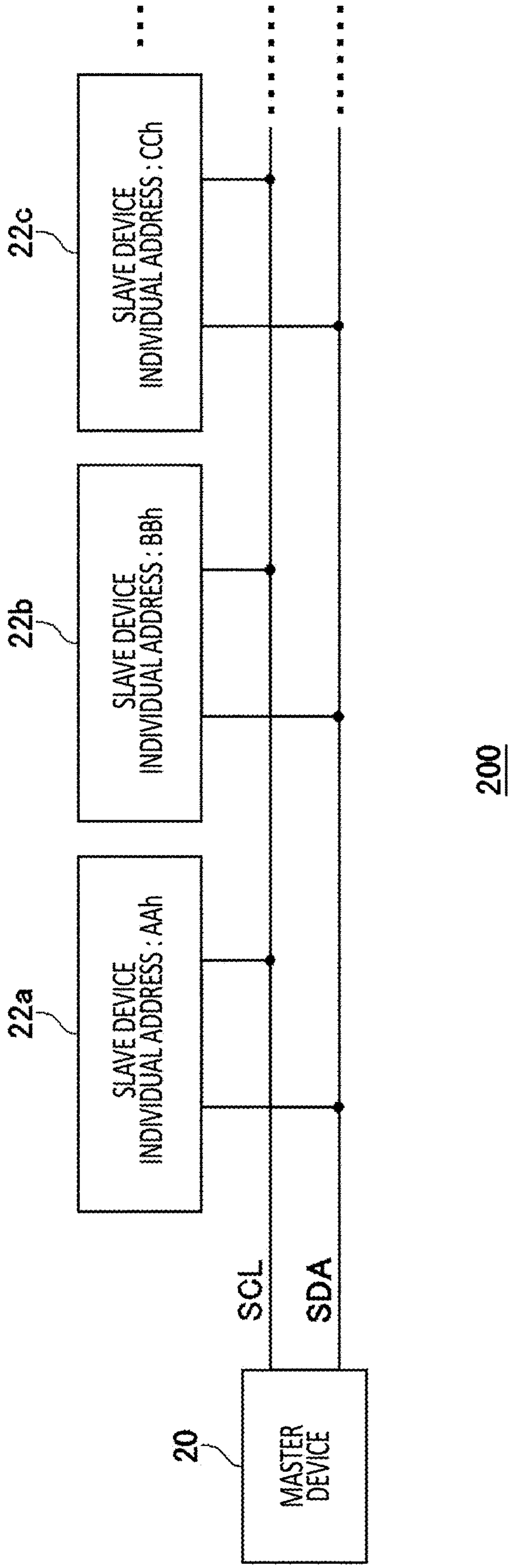
FIG. 4 is a diagram showing an example of a conventional master-slave configuration for controlling an IC chip.

FIG. 4 shows an example of the conventional communication system 200 to control the IC chip configured with a master-slave configuration. The communication system 200 is configured to include the master device 20 and the plurality of slave devices 22*a*-22*c*. Each of the master devices 20 and the plurality of slave devices 22*a*-22*c* is an IC chip.

The master device 20 transmits the control signal to control each of the slave devices 22*a*-22*c*. For example, the data communication of the control signal is performed in the I2C communication method (the I2C protocol) between the master device 20 and each of the slave devices 22*a*-22*c*. In particular, in the I2C protocol, the master device 20 controls the slave devices 22*a*-22*c* by transmitting a serial clock (SCL) signal and a serial data (SDA) signal.

The slave devices 22*a*-22*c* are the IC chips provided for each of the voice coil motors 121, 123, and 125 to control the operation of the voice coil motors 121, 123, and 125. Each of the slave devices 22*a*-22*c* has an individual address different from each other so that the master device 20 distinguishably controls each IC chip. In the example of the diagram, the slave device 22*a*, the slave device 22*b*, and the slave device 22*c* have the individual address AAh, the individual address BBh, and the individual address CCh, respectively.

The master device 20 uses the individual addresses AAh-CCh in the control signal to specify one of the slave devices 22*a*-22*c* targeted for processing and then specifies the register address to which the processing is written. Furthermore, the master device 20 specifies the data to be written to the register address specified subsequently in the control signal. The specific content of the control signal transmitted by the master device 20 is detailed with reference to FIG. 5 and FIG. 6.

In the diagram, three slave devices 22*a*-22*c* are shown as the slave devices 22 included in the communication system 200, but the number of the slave devices 22*a*-22*c* is not limited to three and it may be less than three or may be equal to or more than four. In the example in FIG. 2, since two IC chips are provided for each of the cameras 12*a*-12*c*, the communication system 200 has six slave devices 22, that is, the slave devices 22*a*-22*f*. On the other hand, when one of the cameras 12 in FIG. 2 and the substrate 16 in FIG. 3 are used in combination, the communication system 200 has five slave devices 22, that is, the slave devices 22*a*-22*e*.

Figure 5:
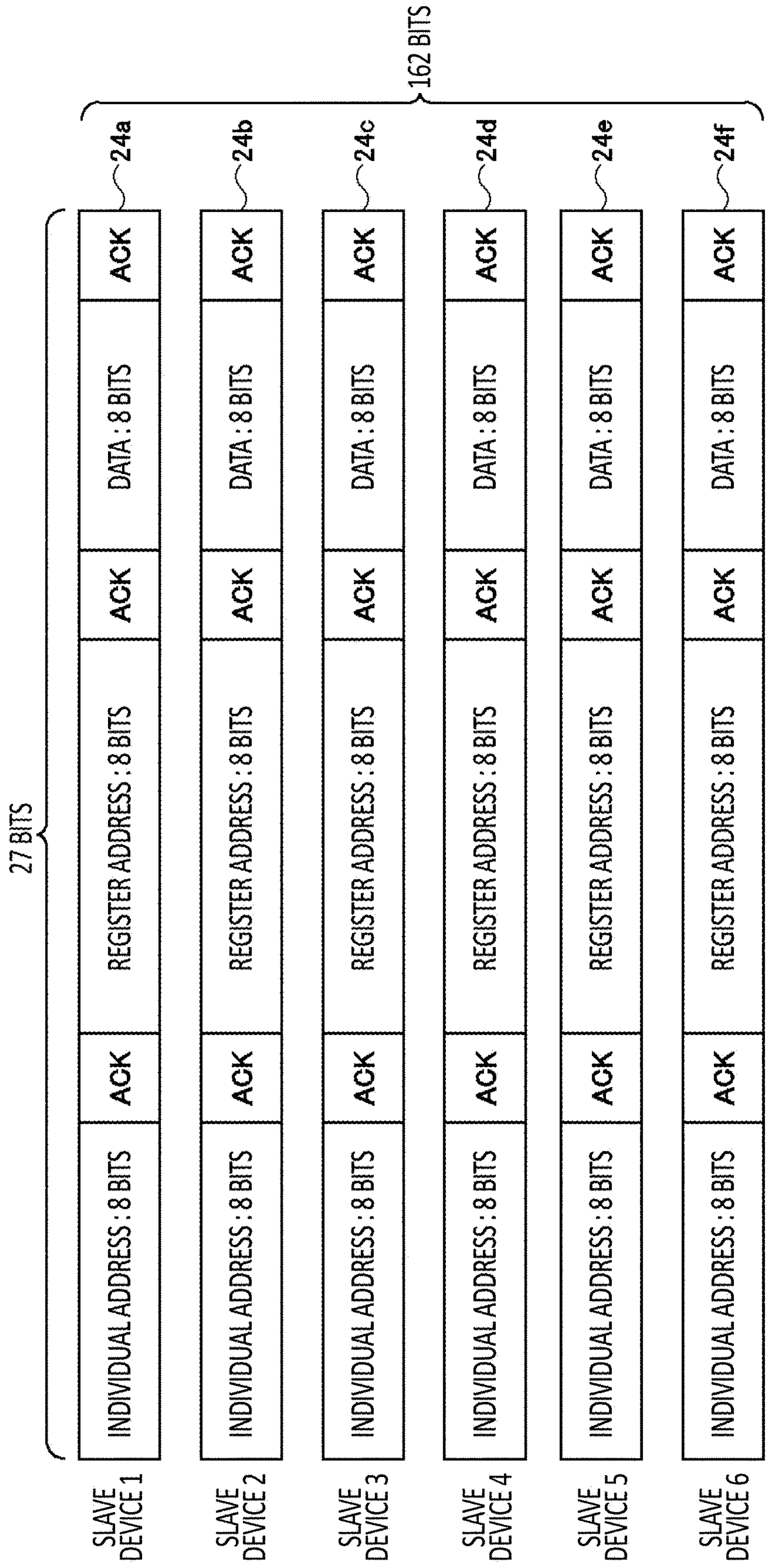
FIG. 5 is a diagram showing an example of a control signal that is transmitted by a master device 20 to control six slave devices 22*a*-22*f*.

FIG. 5 shows an example of the control signal transmitted by the master device 20 to control the six slave devices 22*a*-22*f*. As described above, in the example in FIG. 2, the master device 20 transmits the control signal for controlling the six slave devices 22*a*-22*f*. The control signal shown in the diagram is configured to include the bit sequences 24*a*-24*f*. The exemplary control signal shown in the diagram is the control signal for instructing to write data with a length of 1 byte (8 bits) to the slave devices 22*a*-22*f*.

The bit sequence 24*a* is a part of the control signal to the first slave device 22*a*. The first 8 bits of the bit sequence 24*a* specify the individual address indicating which slave device is to be controlled. The bit sequence 24*a* includes the data with a length of 1 bit so that the master device 20 receives the acknowledgment (ACK) from the slave device 22 to which the specified individual address is assigned.

Then, the bit sequence 24*a* includes a register addressing bit to specify the write position in the bits within the register among registers included in the slave device 22*a*. After the register addressing bit, the bit sequence 24*a* again includes the data with a length of 1 bit to transmit the acknowledgment (ACK) from the slave device 22 to the master device 20.

The bit sequence 24*a* then includes the data sequence of 8 bits to define the content of the data to be written to the register of 1 byte (8 bits) included in the slave device 22*a*. After the data sequence of 8 bits, the bit sequence 24*a* again includes the data with a length of 1 bit for an acknowledgment (ACK).

As a result, the bit sequence 24*a* includes the data with a data length of 27 bits in total. Subsequently, this is followed by the bit sequence 24*b*-24*f* such as the bit sequence 24*b* to control the second slave device 22, the bit sequence 24*c* to control the third slave device 22, . . . , and so on if six slave devices 22 are controlled. The bit sequences 24*b*-24*f* have the same length as the bit sequence 24*a*. Therefore, the control signal to instruct writing data with a length of 1 byte (8 bits) to the slave device 22*a*-22*f* has a data length of 27*6=162 bits.

When the slave devices 22*a*-22*f* process such control signal, each of the slave devices 22*a*-22*f* sometimes starts the process in the order in which the communication from the master device 20 to the slave device ends. Therefore, for example, when the optical system 120 or the image sensor 18 is controlled to move from the current position to the target position in the X-Y plane, the drive timings of the actuators controlled by the slave devices 22*a*-22*f* are sometimes not aligned. In such a case, the actuator that drives the optical system 120 or the image sensor 18 in the X direction and the actuator that drives them in the Y direction are controlled at different timings. As a result, the optical system 120 or the image sensor 18 sometimes does not move from the current position to the target position along the straight line connecting the current position and the target position but moves in a zigzag pattern and does not operate smoothly.

Figure 6:
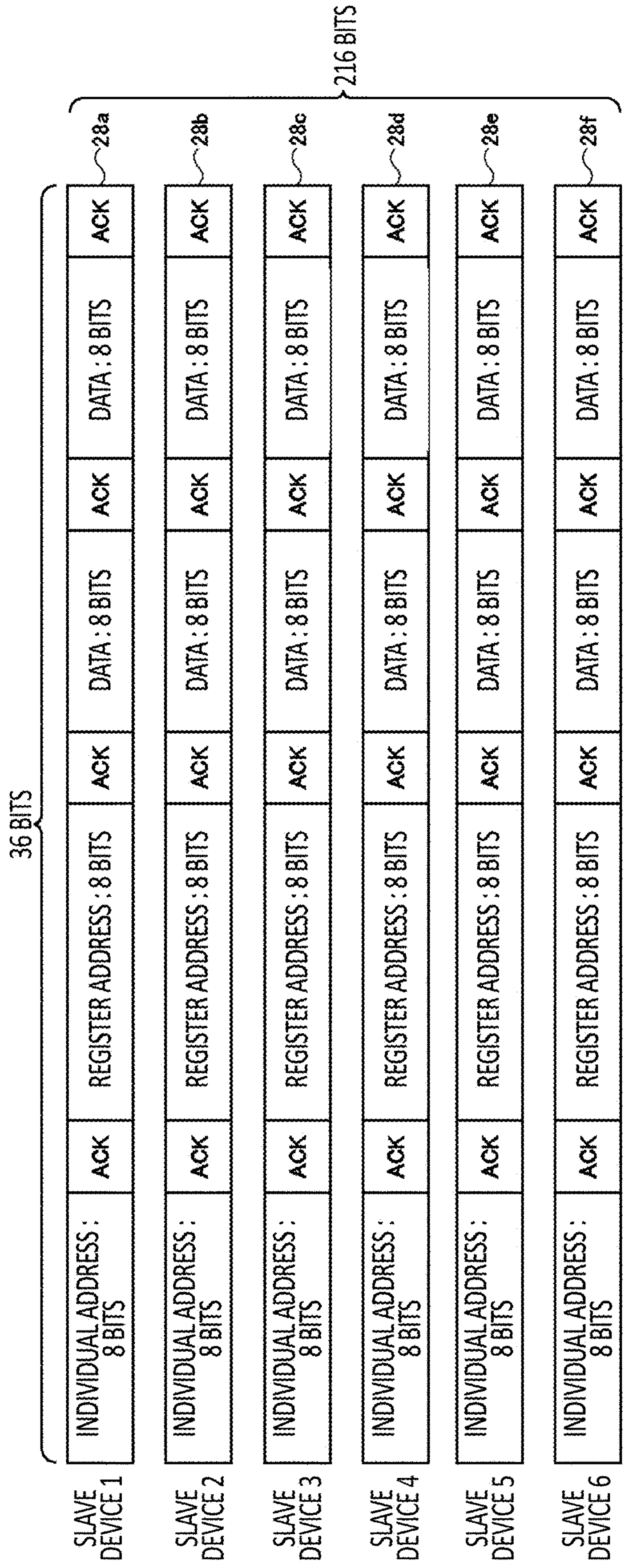
FIG. 6 is a diagram showing another example of a control signal that is transmitted by the master device 20 to control six slave devices 22*a*-22*f*.

FIG. 6 shows another example of the control signal transmitted by the master device 20 to control six slave devices 22*a*-22*f*. In the example of FIG. 2, the master device 20 transmits the control signal to control six slave devices 22a-22f. The control signal shown in the diagram is configured to include the bit sequences 28a-28f. The exemplary control signal shown in the diagram is the control signal to instruct writing data with a length of 2 bytes (16 bits) to the slave devices 22a-22f.

The bit sequence 28a is a part of the control signal to the first slave device 22a. The first 8 bits In the control signal bit sequence 28a specify the individual address indicating the slave device targeted for control. The bit sequence 28a includes the data with a length of 1 bit so that the master device 20 receives the acknowledgment (ACK) from the slave device 22 to which the specified individual address is assigned.

Then, the bit sequence 28a includes a register addressing bit to specify the write position in the bits among registers included in the slave device 22a. After the register addressing bit, the bit sequence 24a includes the data with a length of 1 bit to transmit the acknowledgment (ACK) from the slave device 22 to the master device 20 again.

The bit sequence 28a then includes the data sequence of 8 bits to define the content of the data to be written to the register included in the slave device 22a. After the data sequence of 8 bits, the bit sequence 28a again includes the data with a length of 1 bit for an acknowledgment (ACK).

In the example in FIG. 6, the bit sequence 28a further includes a data sequence of 8 bits to be written to the register that the slave device 22a has. After that, the bit sequence 28a again includes data with a length of 1 bit for acknowledgment (ACK).

As a result, the bit sequence 28a includes data with a data length of 36 bits in total. The bit sequences 28b-28f have the same length as the bit sequence 28a. Therefore, the control signal to instruct writing data with a length of 2 bytes (16 bits) to the slave devices 22a-22f has a data length of 36*6=216 bits.

In this way, in the conventional communication system 200, data communication of 1 byte using the I2C protocol involves the communication of the control signal of 162 bits, while data communication of 2 bytes involves the communication of the control signal of 216 bits. Such communication puts pressure on the communication bandwidth of the I2C communication line.

As with the example in FIG. 5, in the control signal of this example, the slave device 32 specified with the individual address individually performs the reading/writing operation of the bits specified with the register addressing bit. In the control signal, each of the bit sequences 24a-24f or the bit sequences 28a-28f are consecutively transmitted and the individual slave devices 22 sometimes independently start the operation in the order in which the communication from the master device to them ends. Therefore, the drive timings of the actuators sometimes vary and the optical system 120 or the image sensor 18 controlled by the slave devices 22a-22c and the slave devices 22a-22c sometimes does not operate smoothly.

Figure 7:
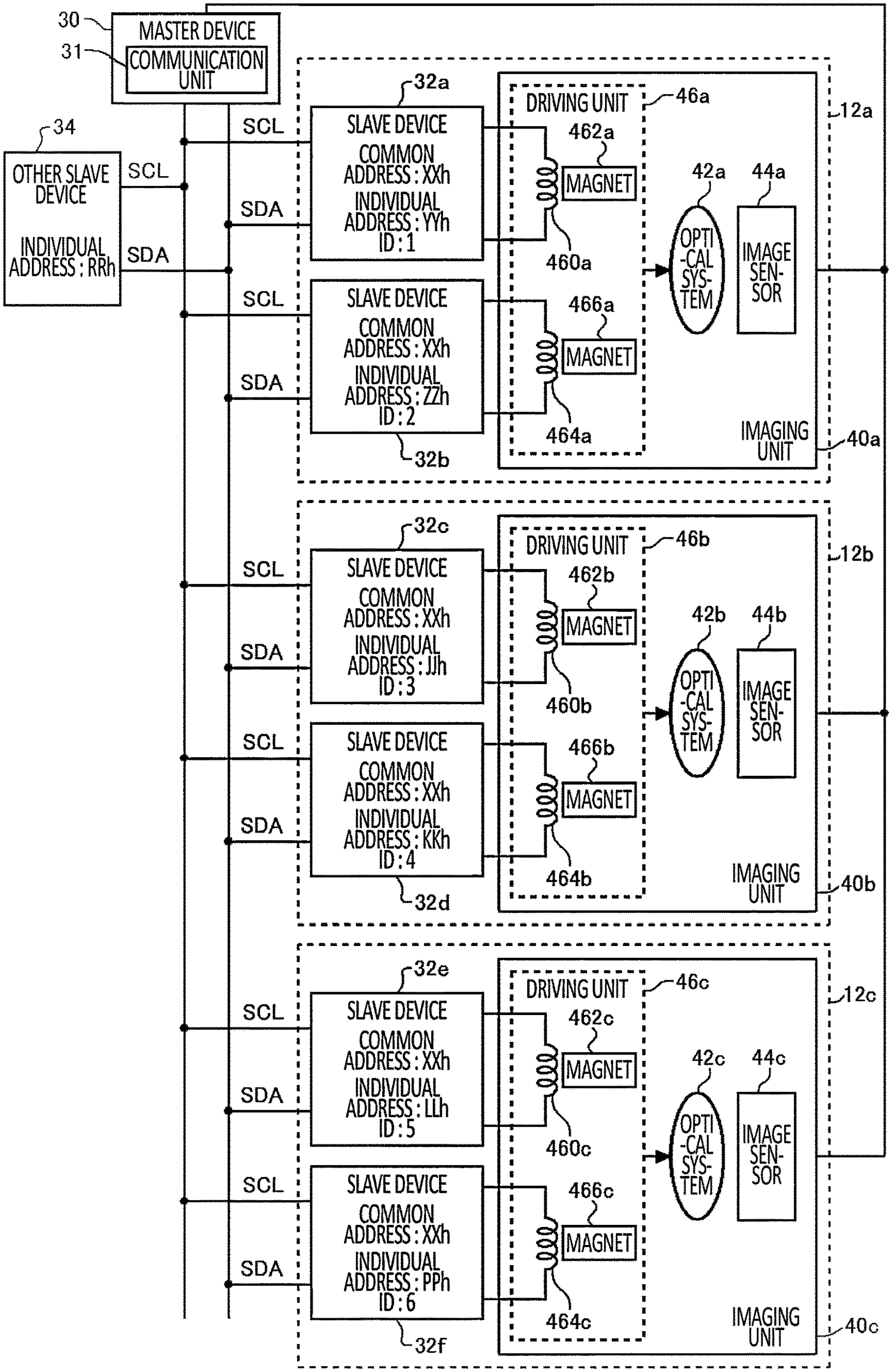
FIG. 7 is a diagram showing an example of a configuration of a communication system according to the present embodiment.

FIG. 7 is a diagram showing an example of a configuration of the communication system to control the cameras 12a-12c according to the present embodiment. It shows the system configured to include the master device 30, the cameras 12a-12c, and another slave device 34.

The camera 12a includes the slave devices 32a and 32b and the imaging unit 40a. The slave devices 32a and 32b control the operation of the imaging unit 40a.

Furthermore, the imaging unit 40a includes an image sensor 44a that captures an image formed via the optical system 42a and a driving unit 46a that drives at least one of the optical system 42a or the image sensor 44a. Each of the driving units 46a includes a voice coil motor comprised of the combination of the air core coils 460 and 464 and the magnets 462 and 466. The optical system 42, the image sensor 44, the air core coils 460 and 464, the magnets 462 and 466, and the like may be the elements corresponding to each element described with reference to FIG. 2 and FIG. 3.

The air core coil 460 and the magnet 462 of the driving unit 46 correspond to one of the directions (the X direction or the Y direction) in which the driving unit 46 drives the optical system 42 or the image sensor 44. The air core coil 464 and the magnet 466 correspond to the other of the directions (the X direction or the Y direction) in which the driving unit 46 drives the optical system 42 or the image sensor 44.

Similarly, the camera 12b includes a slave device 32c and 32d and an imaging unit 40b. The camera 12c includes slave devices 32e and 32f and an imaging unit 40c. The imaging units 40b and 40c have a similar configuration to the imaging unit 40a.

In this way, the slave device 32 is provided on each of the plurality of imaging units 40. However, the slave device 32 may be provided at any position within the communication system, provided that the position allows controlling the drive of any one of the optical system 42 or the image sensor 44.

As described above with reference to FIG. 2, when the OIS control is performed for two cameras 12a and 12b, the cameras 12b and 12c, or the cameras 12c and 12a among the cameras 12a-12c at a time, four slave devices 32 are controlled. In the present embodiment, such embodiment is described.

As in the example described with reference to FIG. 3, in the embodiment in FIG. 7, the OIS and BIS controls are also sometimes performed with the substrate 16 provided for one camera 12. In this case, two slave devices 32 (the IC chips) for controlling the OIS of the camera 12 are provided and three slave devices 32 (the IC chip) are provided for controlling the BIS of the substrate 16. In this way, a total of five slave devices 32 are controlled by the control signal from the master device 30.

The master device 30 controls the slave devices 32a-32f and the other slave device 34. Specifically, the master device 30 controls the operation of the device by performing data communication of control signals, which are a serial clock (SCL) signal and a serial data (SDA) signal, via a bus to the slave devices 32a-32f and the other slave device 34. The master device 30 includes a communication unit 31 to perform the data communication for transmitting such control signal to the slave device 32 via the bus. In this way, the "communication system" is configured that includes the master device 30, the slave devices 32a-32f, and the other slave device 34.

The slave devices 32a-32f are the devices that are in data communication with the master device 30 via the bus and are controlled based on the common address and the individual address based on the control signal that is output from the master device 30. In particular, the slave devices 32a and 32b control the electromagnetic actuator in the driving unit 46a, that is, the voice coil motor. To perform such control, a common address, which is the address common to the plurality of slave devices 32, and an individual address that uniquely identifies each of the plurality of slave devices 32 are assigned to each of the slave devices 32. The master device 30 can perform the setting of the ID of the slave device 32 and individual settings via the individual address. The ID may be an indicator that can identify all the slave devices 32 having the same common address in the ascending order. For example, if the same common address is assigned to the six slave devices 32, the IDs assigned to each of the six slave devices 32 may be any one of "ID1", "ID2", "ID3", "ID4", "ID5", and "ID6".

As with the communication system 200, the slave devices 32*a*-32*f* in the present embodiment are also in data communication with the master device 30 in the I2C communication method. In addition, the slave devices 32*a*-32*f* are the IC chips connected to the driving units 46*a*-46*c* to control the operation of the driving units 46*a*-46*c*.

The other slave device 34 is a device to which the common address assigned to the slave device 32*a*-32*f* is not assigned by the master device 30. The other slave device 34 may have different common addresses (not shown) from the slave devices 32*a*-32*f*. The other slave device 34 may have an individual address such that it is individually controlled by the control signal from the master device 30. In the present embodiment, the other slave device 34 has the individual address: RRh.

Figure 8:
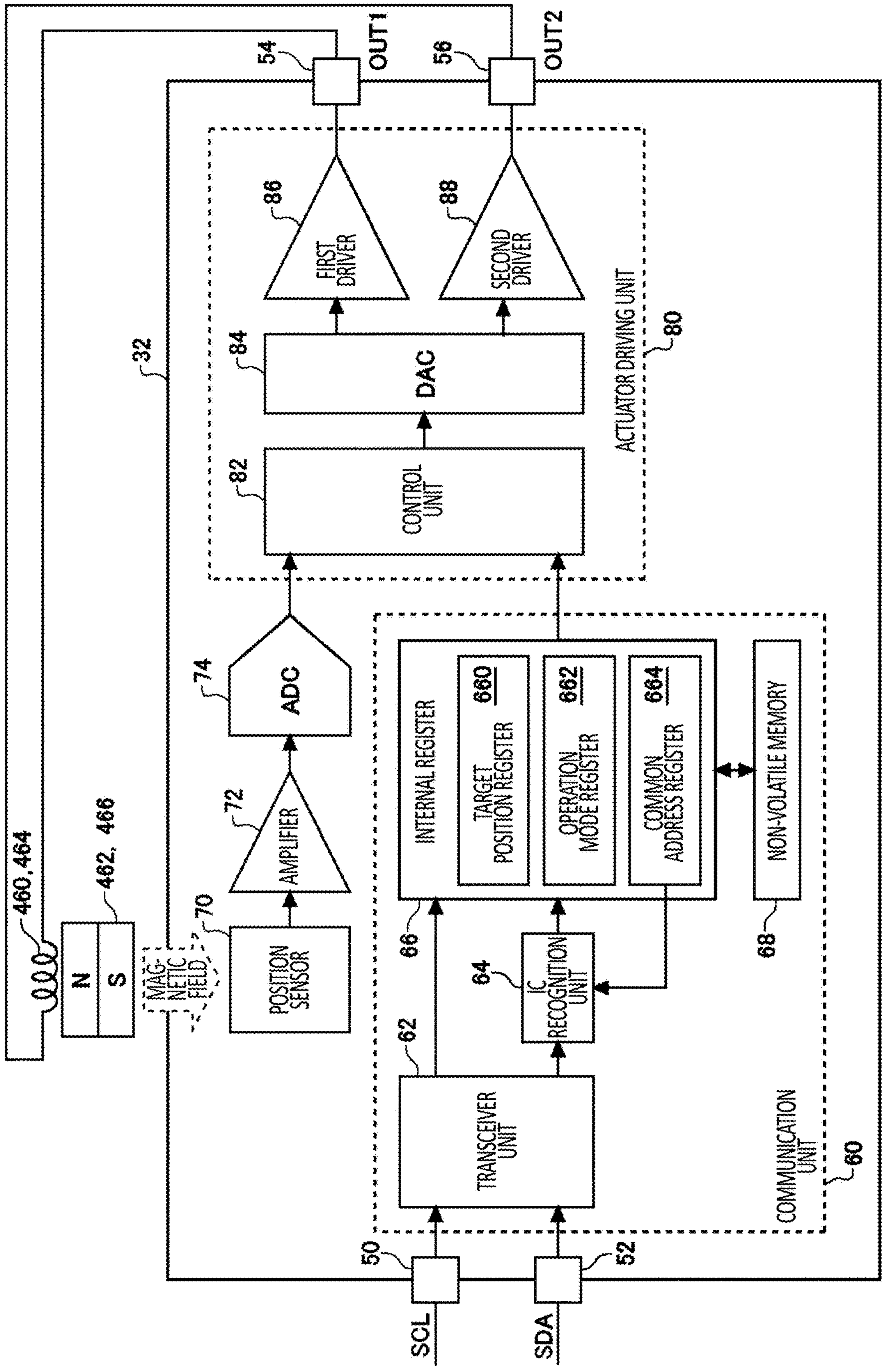
FIG. 8 is a diagram showing an example of a configuration of the slave device 32.

The internal configuration of individual slave device 32 is then described with reference to FIG. 8. FIG. 8 is a diagram showing an example of the configuration of the slave device 32. The slave device 32 includes input terminals 50 and 52, the communication unit 60, the position sensor 70, the amplifier 72, the ADC 74 (ADC: Analog to Digital converter), the actuator driving unit 80, and the output terminals 54 and 56. Each of the slave devices 32*a*-32*f* shown in FIG. 7 has the internal configuration of the slave device 32 shown in FIG. 8.

The slave device 32 performs control to move the optical system 42 or the image sensor 44 to the target position based on the SCL signal input from the input terminal 50, the SDA signal input from the input terminal 52, and the position information of the magnet 462 or 466. For this purpose, the slave device 32 outputs the current with a desired magnitude from the output terminals 54 and 56 to the air core coil 460 or 464.

The communication unit 60 receives the control signal transmitted from the master device 30 and performs data communication with the master device 30 based on the control signal to read or write the data with a data length indicated in the data length information included in the control signal. In addition, an ID indicating a predetermined order may be uniquely assigned to the slave device 32 such that the communication unit 60 receives or transmits data from/to the master device 30 in the predetermined order assigned to the slave devices 32*a*-32*f*. The communication unit 60 includes a transceiver unit 62, an IC recognition unit 64, an internal register 66, and a non-volatile memory 68.

The transceiver unit 62 receives the SCL signal input from the input terminal 50 and the SDA signal input from the input terminal 52 and transmits to the IC recognition unit 64 the part used by the slave device 32 to recognize the common address or individual address among the control signal. Furthermore, the transceiver unit 62 transmits, to the internal register 66, the data to be read from each internal register 66 or to be written to each internal register 66.

The IC recognition unit 64 recognizes whether the slave device 32 on which the IC recognition unit 64 is mounted is targeted for control as the slave device 32 targeted for control indicated in the control signal. Specifically, the IC recognition unit 64 recognizes whether a group of the slave devices 32 having a common address is potentially to be targeted for control based on the part, among the control signal transmitted by the transceiver unit 62, used by the slave device 32 to recognize the common address or individual address. Alternatively, the IC recognition unit 64 recognizes whether the slave device 32 having the individual address is targeted for control. Alternatively, when recognizing that a group of slave devices 32 having the common address is potentially to be targeted for control, the IC recognition unit 64 recognizes whether the slave device 32 is targeted for control based on the ID indicated in the common address register 664 and the specifying information included in the control signal communicated from the master device 30. Furthermore, the IC recognition unit 64 recognizes, based on the ID indicated in the common address register 664 and the data length information included in the control signal, the register address of the slave device 32 from/to which the data should be read or written, the data length of data, and the timing of access for reading or writing the data. The specifying information and the data length information included in the control signal are described below in detail.

The internal register 66 is a register for recording the control information for the actuator driving unit 80 to control the electromagnetic actuator. The internal register 66 includes a target position register 660, an operation mode register 662, and a common address register 664.

The target position register 660 is a register to which the actuator driving unit 80 stores the information about the target position at which the optical system 42 or the image sensor 44 are driven. The operation mode register 662 is the register to which the actuator driving unit 80 stores the information about the operation mode in the control for driving the optical system 42 or the image sensor 44.

The common address register 664 is the register indicating the common address and the ID that the slave device 32 has. Therefore, the IC recognition unit 64 can compare the common address bits indicated in the control signal to the value indicating the common address indicated in the common address register 664 to determine whether the slave device 32 belongs to the group of the slave devices 32 that are potentially to be targeted for control in the control signal. In addition, the IC recognition unit 64 recognizes the slave device 32 currently targeted for control in communication with the master device 30 by referring to the specifying information indicated in the control signal, specifically, the high-order bits of the ADRS bits described below, and comparing it to the ID of the common address register 664. Then, if the IC recognition unit 64 recognizes its own slave device as the slave device 32 currently targeted for control in communication with the master device 30, it further recognizes the timing at which its own slave device communicates with the master device 30 according to the value indicating the ID indicated in the common address register 664 and the data length information, specifically, the information indicated in the low-order bits of the ADRS bits described below. The common address register 664 functions as an "ID storage unit" that stores the IDs uniquely assigned in a predetermined order for each of the plurality of slave devices.

The non-volatile memory 68 is the memory for storing data with a larger volume or the data that should be stored for a longer period or the like than that of the data stored in the internal register 66, for the control information used by the actuator driving unit 80 to control the electromagnetic actuator. The non-volatile memory 68 is mounted within the slave device 32. The non-volatile memory 68 may be a non-volatile memory such as a flash memory.

The position sensor 70 detects the position of the magnet 462 or the magnet 466 based on the magnetic field around the magnet 462 or the magnet 466. For example, especially when the magnet 462 or the magnet 466 are provided in the holding frame of the optical system 42, the position sensor 70 detects the position of the optical system 42 by detecting the position of the magnet 462 or the magnet 466. The position sensor 70 is a magnetic sensor comprised of a magnetic sensor element such as a hall element, a TMR element utilizing tunnel magnetoresistance effect, a GMR element utilizing giant magnetoresistance, or the like, for example. The position sensor 70 outputs the voltage or current based on the detected magnetic field to the amplifier 72.

The amplifier 72 amplifies the voltage or current that is output from the position sensor 70 and outputs it to the ADC 74. The ADC 74 converts the voltage or current that is output from the amplifier 72 into the digital signal indicating the position information of the optical system 42 and outputs it to the actuator driving unit 80.

To control the current passing through the air core coil 460 or 464 constituting the electromagnetic actuator, the actuator driving unit 80 supplies the voltage or current that is output from the output terminals 54 and 56 or the like to the electromagnetic actuator and drives it. Each voice coil motor mentioned with reference to FIG. 2 and FIG. 3 is an example of the electromagnetic actuator. The actuator driving unit 80 includes a control unit 82, a DAC 84 (DAC: Digital to Analog converter), a first driver 86, and a second driver 88.

The control unit 82 controls the current passing through the air core coil 460 or 464 constituting the electromagnetic actuator based on the control information indicated in the internal register 66 and the digital signal indicating the position information of the optical system 42 that is output from the ADC 74. To control the current passing through the air core coil 460 or 464, the control unit 82 outputs a digital signal for the control information. The DAC 84 converts the digital signal, output from the control unit 82, into an analog signal and outputs it to the first driver 86 or the second driver 88.

In response to the analog signal that is output from the DAC 84, the first driver 86 and the second driver 88 supply the voltage, current or power that is output from the output terminal 54 and 56 to the electromagnetic actuator. The first driver 86 and the second driver 88 may be the drivers to supply currents with polarities opposite to each other to the air core coil 460 or 464.

Figure 9:
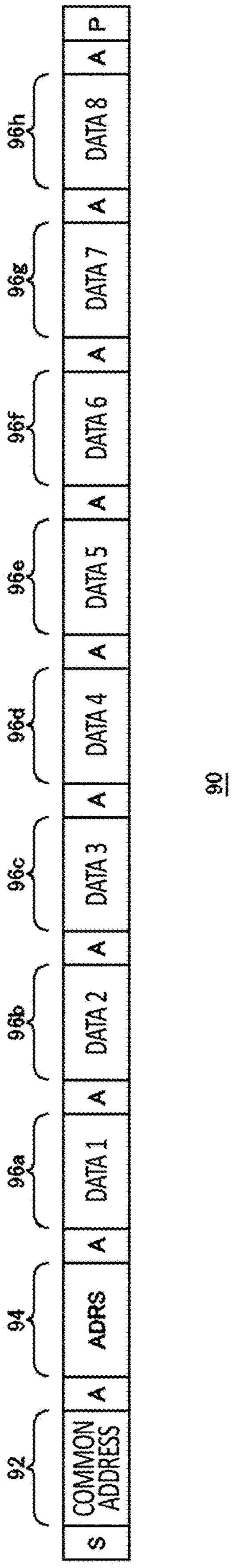
FIG. 9 is a diagram showing an example of the control signal 90 according to an embodiment.

With reference to FIG. 9 and thereafter, a case is described in which, in the control signal used by the master device 30 to control the slave device 32, the address information indicating the slave device 32 targeted for control has a common address. However, the address information may have individual address bits as in the conventional control signal described with reference to FIG. 5 and FIG. 6.

In this way, when the address information indicates an individual address, the control signal generated by the master device 30 may include register information indicating the register address of the slave device 32 from/to which the slave device 32 targeted for data communication corresponding to the individual address bits should read or write data, as in the examples in FIG. 5 and FIG. 6.

When the individual address of the slave device 32 is indicated in the address information, the communication unit 60 is in data communication with the master device 30 to read or write data by accessing the register address of the slave device 32 indicated in the register information. Therefore, in this case, the indicated master device 30 and slave device 32 perform a process that is similar to those of the master device 20 and the slave device 22 shown in the communication system 200 in FIG. 4 to FIG. 6.

In this way, the master device 30 and the slave device 32 in the present embodiment can perform both the process using the common address bits described with reference to FIG. 9 and thereafter and the conventional process described with reference to FIG. 4 to FIG. 6. In the master device 30 and the slave device 32 of the present embodiment, such process may also be performed to process a single individual slave device 32. In order to implement such process, the master device 30 can generate and communicate the corresponding control signal.

FIG. 9 shows an example of the control signal 90 according to an embodiment. The control signal 90 is configured to include common address bits 92, ADRS bits 94, and data 96*a*-96*h*.

The common address bits 92 are the bits for specifying a plurality of slave devices 32 that are potentially to be targeted for communication with the master device 30 using one control signal. The common address bits 92 may be the bits for specifying the plurality of slave devices 32 that control the same control target such as the imaging device 10, for example. In addition, the part with a length of 1 bit before the common address bits 92 indicates whether the slave device 32 should read data or should write data. This part with a length of 1 bit corresponds to "the first bit".

The communication unit 60 determines whether the slave device 32 should read data or should write data based on the value of the first bit. The common address bits 92 indicate the address common to the plurality of slave devices. The address information is configured to include the first bit and the common address bits 92. Based on the comparison between the address information of the common address bits 92 and the common address stored in the common address register 664, the communication unit 60 determines whether its own slave device belongs to a group of the slave devices 32 that are potentially to be targeted for control.

The ADRS bits 94 specify at least one slave device 32 targeted for data communication among a plurality of slave devices 32. The information that specifies at least one slave device 32 among the information indicated in the ADRS bits 94 corresponds to "the specifying information". The communication unit 60 may decide the order of the reading or writing of data for its own slave device based on the ID assigned to each of the plurality of slave devices 32 and the specifying information.

Furthermore, the ADRS bits 94 include, in the part other than the bits including the specifying information, "the data length information" that indicates the register address of the internal register 66 to be accessed and the data length received or transmitted by the slave device 32 specified in the specifying information.

When the communication unit 60 determines, based on the address information of the common address bits 92, its own slave device as belonging to the group of the slave devices 32 that are potentially to be targeted for control, it determines, based on the specifying information indicated in the ADRS bits 94 and its own slave device's ID, whether its own slave device is the slave device 32 targeted for control. When the communication unit 60 determines that its own slave device is the slave device 32 targeted for control, it communicates with the master device 30 to read or write data (any of data 96*a*-96*h*) at a timing corresponding to the specifying information, the data length information, and its own slave device's ID. Therefore, when its own slave device is selected in the specifying information, the communication unit 60 decides the order of the selected slave device 32 among a plurality of slave devices 32 to read or write, from/to the register of the slave device 32, the data with a data length indicated in the data length information according to the ID of the slave device 32 on which the communication unit 60 is provided and the specifying information indicated in the control signal, and performs data communication with the master device 30 at a timing according to the order. On the other hand, the communication unit 60 ignores the data 96*a*-96*h*, when it determines its own slave device as not the slave device 32 targeted for control. Therefore, the communication unit 60 determines not to perform communication with the master device 30 when its own slave device is not selected in the specifying information. In this way, with one control signal 90, some specific slave devices 32 among the plurality of slave devices 32 having the same common address can be operated as the control target simultaneously. In addition, even if there is a slave device 32 not targeted for control among the plurality of slave devices 32 having the same common address, the control signal 90 of the present embodiment does not need to include the dummy data for the slave device 32 not targeted for control. The ADRS bits 94 will be described below with reference to FIG. 10.

In this way, combinations of the plurality of slave devices 32 targeted for control are specified in the address information and the specifying information and the data position for reading from the internal register 66 or writing to the internal register 66 is identified in the data length information. Each of the common address bits 92 and the ADRS bits 94 includes the acknowledgment (ACK) bit with a length of 1 bit, subsequently followed by data 96*a*-96*h*.

The data 96*a*-96*h* may be the data for performing the reading of the internal data and the operation setting within the internal register 66 in each of the plurality of slave devices 32. Alternatively, the data 96*a*-96*h* may be the data for controlling the actuator driving unit 80. In other words, the data 96*a*-96*h* may be the data for each of the plurality of slave devices 32 to drive at least one of the respective optical system 42 or the image sensor 44 by controlling the driving unit 46 connected to each of them according to the respective data 96*a*-96*h*.

In the present embodiment, six slave devices 32 are provided in FIG. 7. Here, among the six IC chips, there are fifteen combinations for operating two IC chips, thirty combinations for operating three IC chips, fifteen combinations for operating four IC chips, six combinations for operating five IC chips, and one combination for operating six IC chips. Therefore, there are fifty seven combinations for controlling two IC chips to six IC chips. Therefore, to represent all of them, values of six bits are needed.

Here, for example, each of the six IC chips is referred to as IC1, IC2, IC3, IC4, IC5, and IC6. Then, assuming that IC3=IC4 and IC5=IC6, when two or more ICs among IC1 to IC6 are controlled, the number of combinations is 11. In this case, all the patterns to control two or more ICs can be covered by values of 4 bits. In the present embodiment, the six IC chips can be controlled with the high-order bits of the ADRS bits 94 with a length of 4 bits by forming two pairs for four IC chips among six IC chips and performing control such that the IC chips included in the pairs are regarded as the same.

Figure 10:
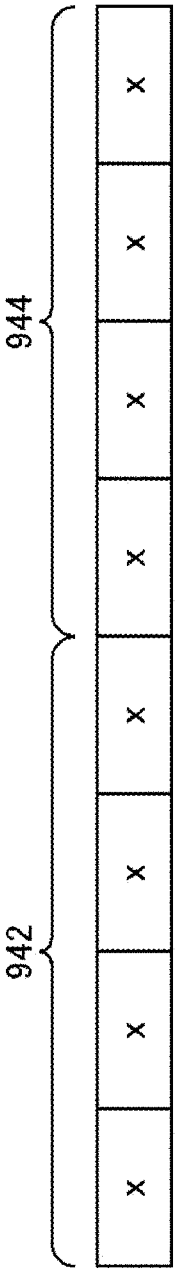
FIG. 10 is a diagram showing an example of the structure of ADRS bits 94.

FIG. 10 is a diagram showing an example of the structure of the ADRS bits 94. The ADRS bits 94 with a length of 8 bits include, for example, high-order bits 942 with a length of 4 bits and low-order bits 944 with a length of 4 bits.

In the high-order bits 942 that include 4 bits of ADRS [7] to ADRS [4], at least one slave device 32 targeted for data communication among the plurality of slave devices 32 is assigned to each bit. The high-order bits 942 correspond to "the first bit sequence".

When the high-order bits 942 have a predetermined first value (for example, 1), the communication unit 60 of the slave device 32 assigned to the bit determines that the slave device 32 is targeted for data communication. On the other hand, when the high-order bits 942 have a predetermined second value (for example, 0), the communication unit 60 of the slave device 32 assigned to the bits determines that the slave device 32 is not targeted for data communication.

The low-order bits 944 of ADRS [3] to ADRS [0] include the data length information corresponding to the register address and the data length of the slave device 32 from/to which the slave device 32 should read or write data. The low-order bits 944 correspond to "the second bit sequence".

The 4 bits of ADRS [3] to ADRS [0] can each take a value of 1 or 0. Therefore, as the patterns indicated by 4 bits of ADRS [3] to ADRS [0], 16 states can be indicated as a result of each bit taking different values. Through these 16 values, the low-order bits 944 can indicate 16 instructions for the register address and the data length of the slave device 32 from/to which data should be read or written. These 16 instructions will be described below with reference to the control map in FIG. 12.

FIG. 11 shows an example of a reference table showing combinations of the slave device 32 (the IC chip) targeted for control according to an embodiment. The slave device 32 targeted for control is selected by the values of the high-order bits 942 among the ADRS bits, that is, ADRS [7] to ADRS [4], with a length of 4 bits.

In the present embodiment, IC1 is targeted for control in a case where ADRS [7] indicates the value of 1, while IC1 is not targeted for control in a case where ADRS [7] indicates the value of 0. Similarly, the IC1 is targeted for control in a case where ADRS [6] indicates the value of 1, while IC1 is not targeted for control in a case where the ADRS [6] indicates the value of 0.

As already described with reference to FIG. 9, control is performed by regarding the set of IC3 and IC4, and IC5 and IC6 as the same. The set of IC3 and IC4 is targeted for control in a case where ADRS [5] indicates the value of 1, while the set of IC3 and IC4 is not targeted for control in a case where ADRS [5] indicates the value of 0. Similarly, the set of IC5 and IC6 is targeted for control in a case where ADRS [4] indicates the value of 1, while the set of IC5 and IC6 is not targeted for control in a case where the ADRS [4] indicates the value of 0.

For a given value in the high-order bits 942 of ADRS bits, the reference table in FIG. 11 is only an example for the combination of IC chips targeted for control and another combination may be used. For example, assuming that IC1=IC2 and IC3=IC4, a bit for controlling IC1 and IC2, a bit for controlling IC3 and IC4, a bit for controlling IC5, and a bit for controlling IC6 can be used. As the reference table for achieving the control in the present embodiment, another reference table may be used, provided that the combination enables control of six ICs with 4 bits.

FIG. 12 shows an example of a control map according to an embodiment. ADRS [3:0], which is the low-order bits 944 of ADRS bits, can take values of 0 to 15. The control map indicates the control performed on the internal register 66 of the slave device 32 and the data length according to the value taken by ADRS [3:0].

When ADRS [3:0] has the value of 0, 1-byte communication is performed at the position 0 of the target position register 660 of the slave device 32. When ADRS [3:0] has the value of 1, 1-byte communication is performed at the position 1 of the target position register 660 of the slave device 32. The position 1 in the target position register 660 may be the position that is consecutive from the position 0 or may be the position that is 1-byte away from the position indicated by the position 0. When ADRS [3:0] has the value of 2, 1-byte communication is performed in each of the consecutive position 0 and position 1 of the target position register 660 of the slave device 32, that is, 2-byte communication is performed.

When ADRS [3:0] has the value of 3, 1-byte communication is performed in the first position of the operation mode register 662 of the slave device 32. When ADRS [3:0] has the value of 4, 1-byte communication is performed in the second position different from the first position. The second position may be the position that is consecutive from the first position or may be the position 1-byte away from the first position. When ADRS [3:0] has the value of 5, 1-byte communication is performed in each of the first position and the second position of the operation mode register 662 of the slave device 32, that is, 2-byte communication is performed.

When ADRS [3:0] has the value of 6, the operational command predetermined in the register at the third position within the operation mode register 662 of the slave device 32 is performed. The operation performed in this operational command is 1-byte communication. Another predetermined operational command may also be set for the case where ADRS [3:0] has values of 7 to 15. In these cases, each of the register, the register address, and the data length that are accessed in the internal register 66 of the slave device 32 may be indicated in the control map.

The communication unit 60 refers to such control map indicating the relationship between the data length information of the low-order bits 944 that is a second bit sequence and the register address and data length of the slave device 32 from/to which the slave device 32 should read or write data. In this way, the IC recognition unit 64 identifies the register address and data length of the slave device 32 from/to which the slave device 32 should read or write data. When the slave device 32 is the target of data communication, the register address of the slave device 32 from/to which the slave device 32 should read or write data is accessed to receive or transmit data with a data length identified based on the data length information according to the ID indicating the predetermined order and the specifying information. The control map shown in FIG. 12 is an example of "a map" indicating the relationship between the data length information, and the register address and data length of the slave device 32 from/to which the slave device 32 should read or write data.

Figure 13:
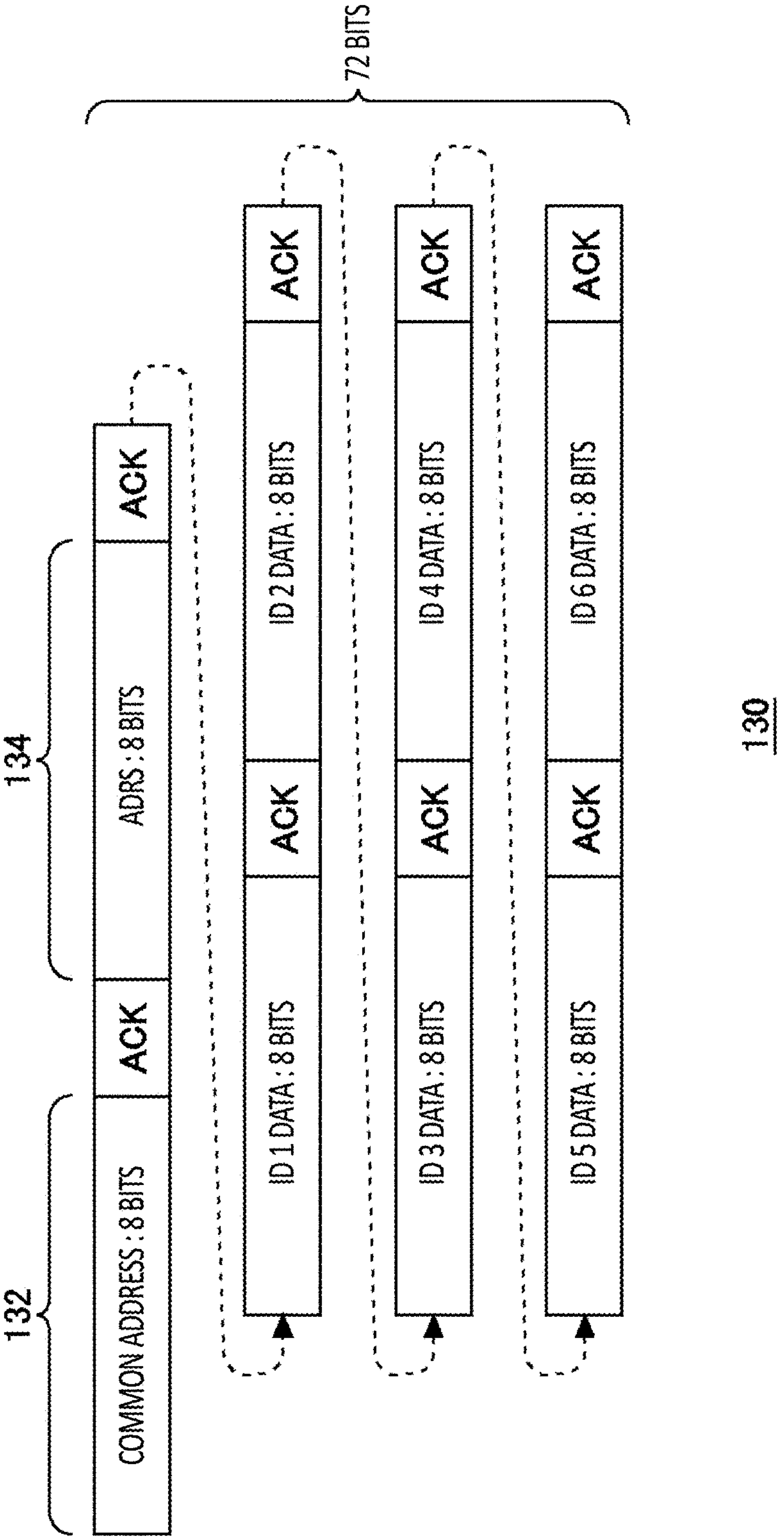
FIG. 13 is a diagram showing an example of the control signal 130 for performing 1-byte writing according to an embodiment.

FIG. 13 shows an example of the control signal 130 for performing 1-byte writing according to an embodiment. In the control signal 130, the first 8 bits of the common address bits 132 specify the group of slave devices 32 to be controlled.

Next, after the common address bits 132 and the following acknowledgment (ACK) bit with a length of 1 bit, the control signal 130 includes the next ADRS bits 134 with a length of 8 bits. The common address bits 132 specify the group of slave devices 32 that are potentially to be targeted for control targets. Furthermore, the ADRS bits 134 allow for selecting the slave device 32 to be enabled as the control target, specifying the register address of the internal register 66 that is to be the target of read/write, reading/writing data according to the command, and specifying the data length for reading/writing according to the command. In the example of FIG. 5, the control signal includes, for six individual slave devices 32, individual address bits with a length of 8 bits to specify the slave device 32 and the register address bits with a length of 8 bits. In the control signal 130, since the common address bits 132 with a length of 8 bits and the ADRS bits 134 with a length of 8 bits allow for collectively specifying the slave devices 32 and the register addresses targeted for processing by the command, the bit sequence of the part specifying the slave devices 32 and the register addresses is shortened.

Subsequently, after the acknowledgment (ACK) bit with a length of 1 bit, the control signal 130 includes the data with a length of 8 bits for reading/writing from/to the slave devices 32 with IDs 1 to 6 together with the respective acknowledgment (ACK) bit with a length of 1 bit. The total length of the bit sequences included in the control signal 130 is 72 bits.

In this way, the inclusion of the common address bits 132 and the ADRS bits 134 simplifies the control signal 130 that indicates, to the slave devices 32 with IDs 1-6, the process for selecting the slave device 32 and the data length or the like for reading or writing. As a result, the total length of the bit sequences included in the control signal 130 is shorter than that of the control signal for 1-byte writing with a length of 162 bits described with reference to FIG. 5. Therefore, in the control signal 130, the communication volume for the control content is saved.

The IDs indicating a predetermined order are uniquely assigned such that the slave device 32 targeted for control among the slave devices 32*a*-32*f* can recognize the order to receive or transmit data from/to the master device 30. The IDs indicating the predetermined order and the specifying information enable the slave device 32 to determine whether it is the slave device 32 targeted for control and determine the timing to receive or transmit the data from/to the master device 30.

Furthermore, at the moment when the communication of the control signal 130 completes, each of the slave device 32 of the present embodiment starts the operation all at once (for example, simultaneously). Therefore, in the example of control to move the optical system 42 or the image sensor 44 from the current position to the target position in the X-Y plane described with reference to FIG. 5, control is performed such that the drive timings of the actuators controlled by the slave devices 32*a*-32*f* in the present embodiment are aligned. In other words, in such a case, the controls of the actuator that drives the optical system 42 or the image sensor 44 in the X direction and the actuator that drives them in the Y direction are started simultaneously. As a result, the movement from the current position of the optical system 42 or the image sensor 44 to the target position can be the movement along the straight line connecting the current position and the target position, for example. In this way, the drive target such as one optical system 42, image sensor 44, or the like controlled by the plurality of slave devices 32 operates more smoothly compared to when the common address is not used.

Figure 14:
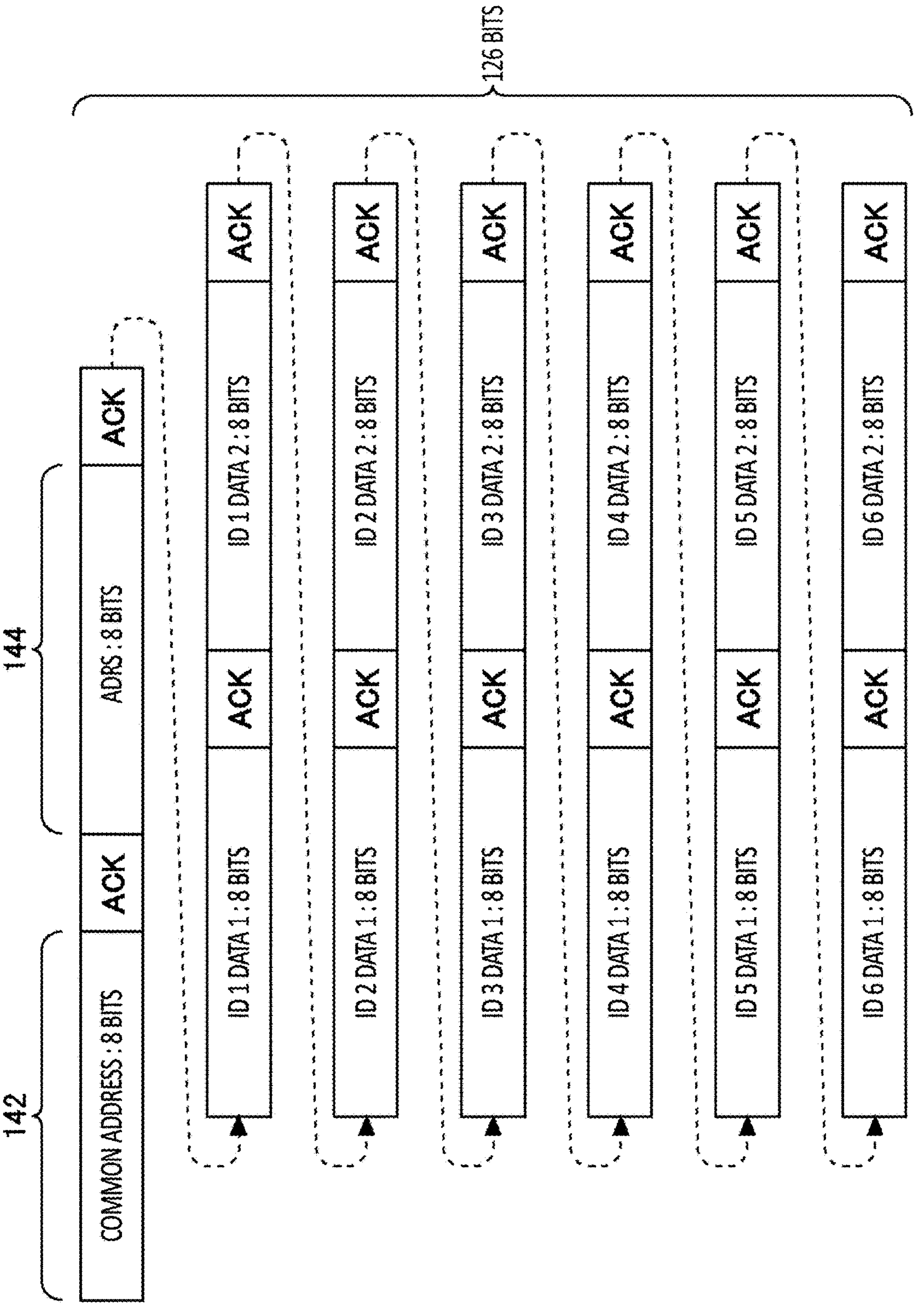
FIG. 14 is a diagram showing an example of the control signal 140 for performing 2-byte writing according to an embodiment.

FIG. 14 shows an example of the control signal 140 for performing 2-byte writing according to an embodiment. As with the control signal 130, the control signal 140 also includes common address bits 142, ADRS bits 144, and accompanying acknowledgment (ACK) bits.

With the control signal 140, 2-byte data writing to the slave devices 32 with IDs 1 to 6 is performed. Here, in comparison to the example in FIG. 6, when 2-byte data writing to six slave devices 32 with IDs 1-6, is performed, in the example in FIG. 6, the six individual address bits with a length of 8 bits and the register address bits with a length of 8 bits specify the slave device 32 targeted for writing data and the target register address.

On the other hand, in the control signal 140, to perform a command on a plurality of slave devices 32, the group of slave devices 32 indicated in the common address bits 142 are potentially to be targeted for data writing. Furthermore, the high-order bits 942 of the ADRS bits 144 specify whether the slave devices 32 are the targets (whether they are enabled) to be in communication with the master device 30 and the order of communication with the master device 30. The communication unit 60 refers to the ADRS bits 144 to recognize the target of communication and the order of communication. In addition, the data length information in the low-order bits 944 of the ADRS bits 144 specifies the register address predetermined for the command and the data length. In this manner, data writing is performed on the internal register 66. In this way, the control signal 140 uses the common address bits 142 and the ADRS bits 144, each length of which is 8 bits, eliminating the need to set the individual address bit and the register address bit for each of the slave devices 32.

In addition to these common address bits 142 and ADRS bits 144, the control signal 140 includes 2-byte data for writing to the slave devices 32 with IDs 1-6. Therefore, the total length of the bit sequence included in the control signal 140 is 126 bits.

In this way, the inclusion of the common address bits 142 and the ADRS bits 144 simplifies and shortens the control signal 140 indicating, to the slave devices 32 with IDs 1-6, the process of selecting the slave device 32 and the data length and the like for reading or writing, in comparison to the control signal with a length of 216 bits shown in FIG. 6. In addition, in each of the slave devices 32 using the control signal 140, the slave devices 32 targeted for control and the order of processing data are decided among the plurality of slave devices 32 that are potentially to be targeted for control based on the IDs read from the common address register 664 and the specifying information indicating the slave devices 32 that are targeted for control and the data length information indicated in the ADRS bits 144. In addition, as with the control signal 130, at the moment when the communication of the control signal 140 completes, the slave devices 32 start operating all at once (for example, simultaneously). In this way, the drive target such as the optical system 42 or the image sensor 44 controlled by the plurality of slave devices 32 can operate more smoothly than in the example in FIG. 6.

Figure 15:
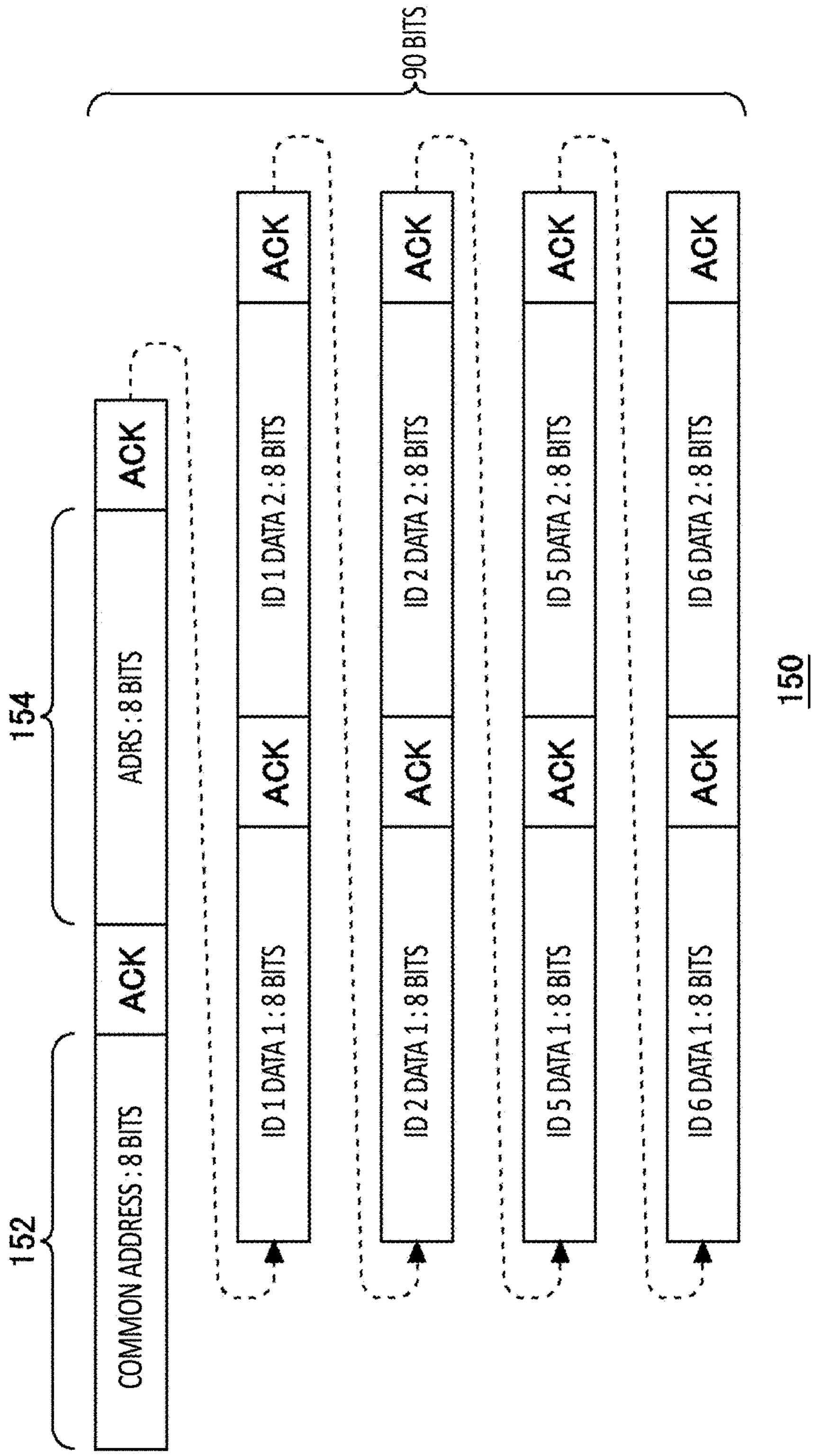
FIG. 15 is a diagram showing an example of the control signal 150 for performing 2-byte writing according to an embodiment.

FIG. 15 shows an example of the control signal 150 for 2-byte writing according to an embodiment. As with the control signals 130 and 140, the control signal 150 also includes common address bits 152, ADRS bits 154, and accompanying acknowledgment (ACK) bits.

With the control signal 150, 2-byte data writing to the slave devices 32 with IDs 1, 2, 5, and 6 is performed. The control signal 150 is an example of the control signal for control assuming that IC3=IC4, and the selected ICs are IC5 and IC6, the case which is described with reference to FIG. 10 and FIG. 11.

This example is the example in which high-order bits ADRS [7]-[4] of the ADRS bits 154 in the reference table corresponding to the ADRS bits in FIG. 11 are: ADRS [7]=1, ADRS [6]=1, ADRS [5]=0, and ADRS [4]=1. In this way, an example of the control signal 150 is shown in which the high-order bits ADRS [7:4] of the ADRS bits 154 are set to 1101b. In this way, data communication can be achieved with one control signal 130 between the master device 30 and some target slave devices 32 among the plurality of slave devices 32 assigned with the same common address.

Following the common address bits 152, the ADRS bits 154, and their acknowledgment (ACK) bits, the control signal 150 includes 2-byte data (and acknowledgment (and ACK) bits) for writing to the slave devices 32 with IDs 1, 2, 5, and 6. The total length of the bit sequences included in the control signal 150 is 90 bits.

In this way, the inclusion of the common address bits 152 and the ADRS bits 154 simplifies the control signal 150 that indicates, to the slave devices 32 with IDs 1-6, the process for selecting the slave device 32 and the data length or the like for reading or writing. In this case, the total length of the bit sequences included in the control signal 150 is even shorter than that of the control signal 140 in comparison to the control signal for 2-byte writing with a length of 216 bits described with reference to FIG. 6.

The communication unit 60 determines, based on the common address indicated in the common address bits 152, whether its own slave device belongs to the group of the slave devices 32 that are potentially to be targeted for control. Furthermore, the communication unit 60 compares the values indicated in the high-order bits ADRS [7]-[4] of the ADRS bits 154 to the ID of the common address register 664 to recognize the slave device 32 currently targeted for control. In addition, based on the recognition result of the slave devices 32 currently targeted for control, its own slave device's ID read from the common address register 664, and the data length identified with the value indicated in the low-order bits of the ADRS bits 154, that is, ADRS [3]-[0], the communication unit 60 recognizes the order of data processing among the slave devices 32 currently targeted for control. The correspondence between the common address bits 152 and the common address allows for setting target positions or the like for the plurality of slave devices 32 with the control signal 150 that is shorter than in the case where individual addresses are used.

Furthermore, as with the control signal 130 and the control signal 140, at the moment when the communication of the control signal 150 completes, the slave devices 32 start operating all at once (for example, simultaneously). As a result, the control signal 150 can also cause the slave device 32 to smoothly control the drive target such as the optical system 42 or the image sensor 44.

The IDs of the slave devices 32 enabled to be targeted for control indicated in the ADRS bits 154 may not be full IDs having the same common address. Among the slave devices 32 in the present embodiment, the slave devices 32 with IDs 1, 2, 5, and 6 are enabled. When the communication unit 60 determines its own slave device as not the slave device 32 targeted for control based on the IDs stored in the common address register 664 and the specifying information of the ADRS bits 154, it ignores the data following the acknowledgment bit after the ADRS bit 154. In this way, when the common address, the ID, and the specifying information are used in combination, the degree of freedom of the slave device 32 that can be specified increases in comparison to the case where only the common address is used. In addition, when the communication unit 60 determines its own slave device as not the slave device 32 targeted for control, it ignores the data following the acknowledgment bit after the ADRS bits 154, hence eliminating the need for the control signal 150 to include the dummy data for the slave devices 32 that are not selected. Therefore, the present embodiment can prevent dummy data from putting pressure on the communication bandwidth in the I2C communication method.

Furthermore, in the control signal 150 in the present embodiment, the timing and data length for accessing the internal register 66 of the target slave device 32 are decided based on the IDs stored in the common address register 664 and the specifying information and the data length information indicated in the ADRS bits 154. As in the present embodiment, when the slave devices 32 with IDs 1, 2, 5, and 6 are enabled, the communication units 60 of the slave devices 32 with IDs 1, 2, 5, and 6 can access the internal register 66 and recognize the timing and data length for communicating data with the master device 30 based on the ID and the specifying information and the data length information. The communication unit 60 waits for the timing to communicate data with the master device 30 when its own slave device is the slave device 32 targeted for control. Therefore, for the control signal 150, the communication unit 60 of the slave device 32 targeted for control can access the internal register 66 at appropriate timing and communicate data with an appropriate data length with the master device 30. In this way, in the present embodiment, since the timing and data length to which the slave device 32 should communicate with the master device 30 can be recognized during the communication, the communication volume and communication time between the master device 30 and the slave device 32 can be reduced.

Figure 16:
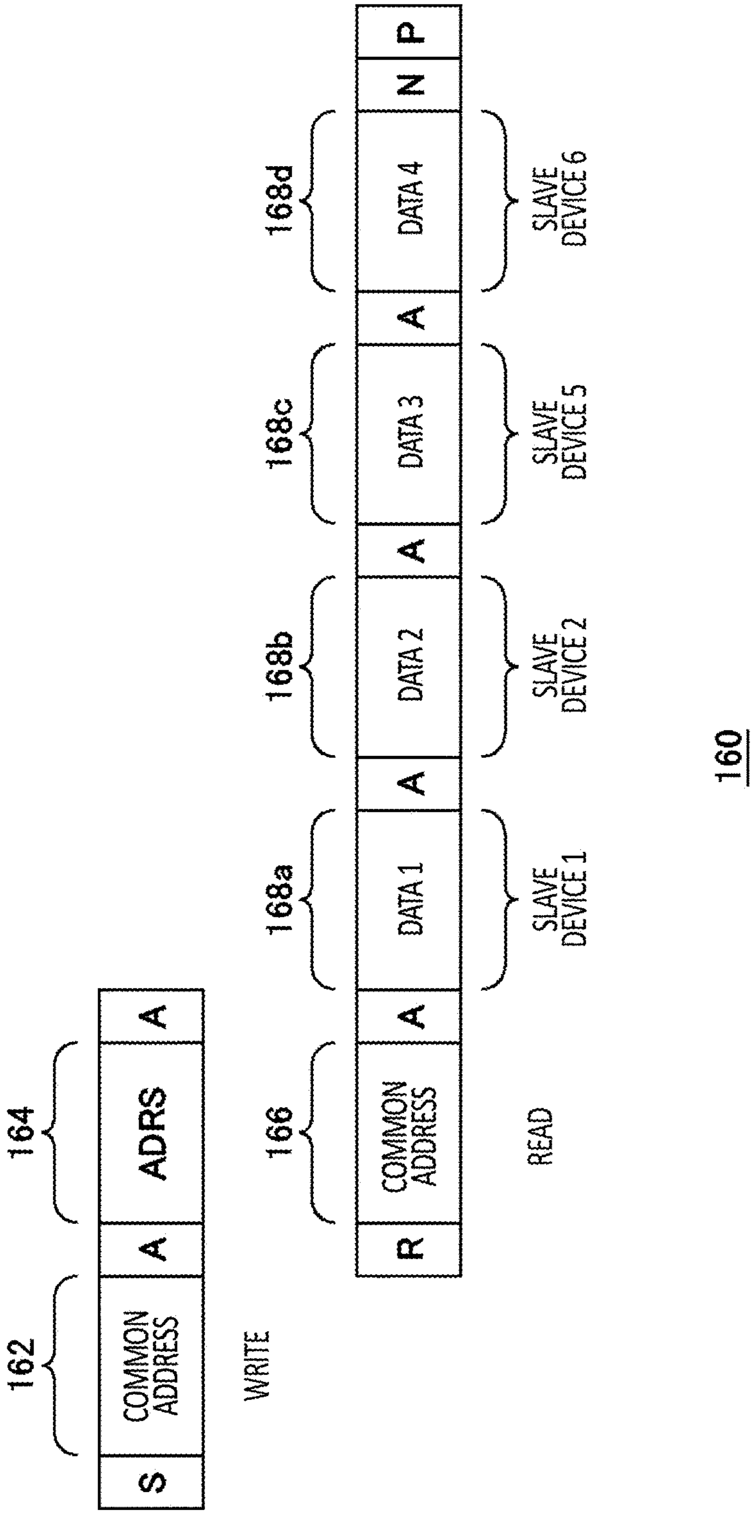
FIG. 16 is a diagram showing an example of the control signal 160 for performing 1-byte reading according to an embodiment.

FIG. 16 shows an example of the control signal 160 for performing 1-byte reading according to an embodiment. In the control signal 160, the first included bit is the bit indicating writing or reading and the first bit specifies writing even if reading is performed.

The control signal 160 then includes common address bits 162 with a length of 8 bits. The control signal 160 then includes ADRS bits 164 after the acknowledgment (ACK) bit.

As with the example in FIG. 15, for the control signal 160, the high-order bits ADRS [7]-[4] in the reference table corresponding to the ADRS bits in FIG. 11 are: ADRS [7]=1, ADRS [6]=1, ADRS [5]=0, and ADRS [4]=1. In this way, an example of the control signal 160 is shown in which the high-order bits ADRS [7:4] of the ADRS bits 164 are set to 1101b. Therefore, in the control signal 160, 1-byte reading from the slave devices 32 with IDs 1, 2, 5, and 6 is performed. When data reading is performed, the control signal 160 includes the common address bits 166 after it includes the bit indicating the reading in the bit indicating the writing or reading. The control signal 160 includes the acknowledgment (ACK) bit after the common address bit 166 and subsequently includes the bit sequence indicating the data 168*a*-168*d* for data 1 to data 4 that are actually read.

As with the control signal for data writing, the total length of the control signal 160 in the present embodiment is shorter than the data length of the control signal for data reading in the conventional communication system 200 FIG. 3.

Figure 17:
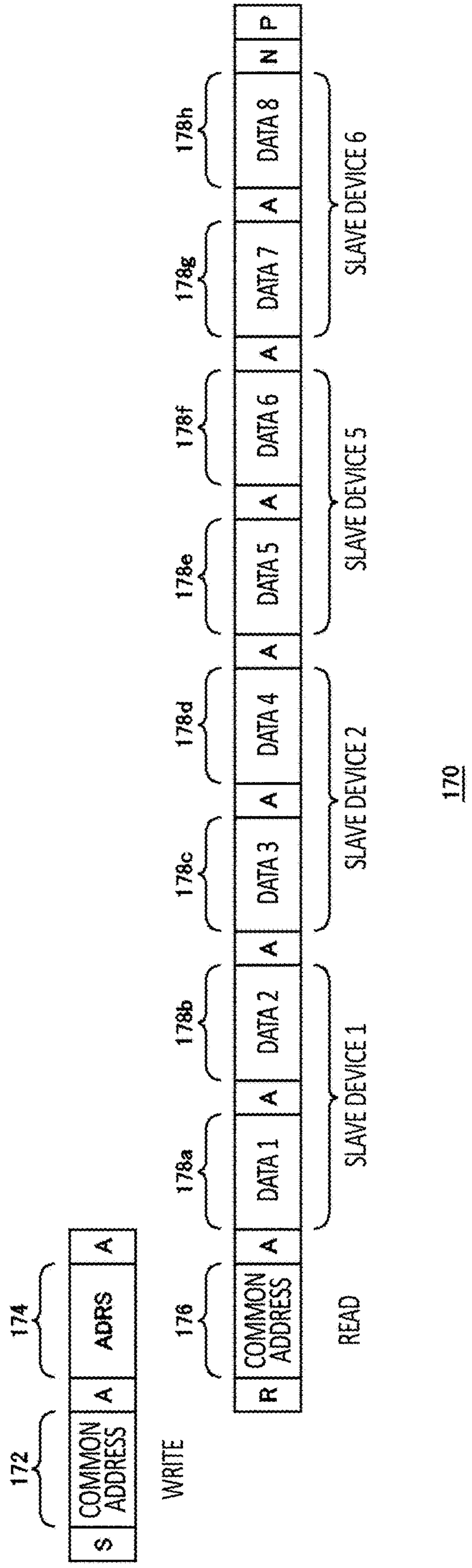
FIG. 17 is a diagram showing an example of the control signal 170 for performing 2-byte reading according to an embodiment.

FIG. 17 shows an example of the control signal 170 for 2-byte reading according to an embodiment. In the control signal 170, the first included bit is the bit indicating writing or reading and the first bit specifies writing.

The control signal 170 then includes common address bits 172 with a length of 8 bits. The control signal 170 then includes ADRS bits 174 after the acknowledgment (ACK) bit.

As with the example in FIG. 15 and FIG. 16, for the control signal 170, the high-order bits ADRS [7]-[4] in the reference table corresponding to the ADRS bits in FIG. 11 are: ADRS [7]=1, ADRS [6]=1, ADRS [5]=0, and ADRS [4]=1. In this way, an example of the control signal 170 is shown in which the high-order bits ADRS [7:4] of the ADRS bits 174 are set to 1101b. Therefore, in the control signal 170, 2-byte reading from the slave devices 32 with IDs 1, 2, 5, and 6 is performed. When data reading is performed, the control signal 170 includes the common address bits 176 after it includes the bit indicating the reading in the bit indicating the writing or reading. After the common address bits 176, it includes the acknowledgment (ACK) bit and subsequently includes the bit sequence indicating the data 178*a* to 178*h* for the data 1 to data 8 that are actually read.

As with the control signal for data writing, the total length of the control signal 170 in the present embodiment is shorter than the data length of the control signal for data reading in the conventional communication system 200 FIG. 3.

According to the slave device 32 configured as described above, the communication unit 60 confirms that the common address of the address information matches the common address register 664 set in the internal register 66 and determines whether its own slave device should read or write data based on the first bit indicated in the address information. The communication unit 60 refers to the high-order bits 942 of the ADRS bits 94 and the reference table as shown in FIG. 11 and determines whether its own slave device is assigned to the bits having "1" among the high-order bits 942. The communication unit 60 then determines its own slave device as targeted for data communication when the address information indicates the common address and the slave device is assigned to the bits having "1" among the high-order bits 942. Furthermore, the communication unit 60 refers to the low-order bits 944 of the ADRS bits 94 and the control map shown in FIG. 12 to identify the register address of the slave device 32 and the data length, corresponding to the data length information of the low-order bits 944, to which its own slave device should read or write data.

On the other hand, the communication unit 60 determines its own slave device as not targeted for data communication when its own slave device is assigned to the bits having "0" among the high-order bits 942. The communication unit 60 then receives or transmits data with a data length identified based on the correspondence between the data length information indicated in the low-order bits 944 and the control map according to the order decided based on the ID read from the common address register 664 and the specifying information indicating the slave device 32 targeted for control indicated in the ADRS bits 94 when its own slave device is targeted for data communication.

Figure 18:
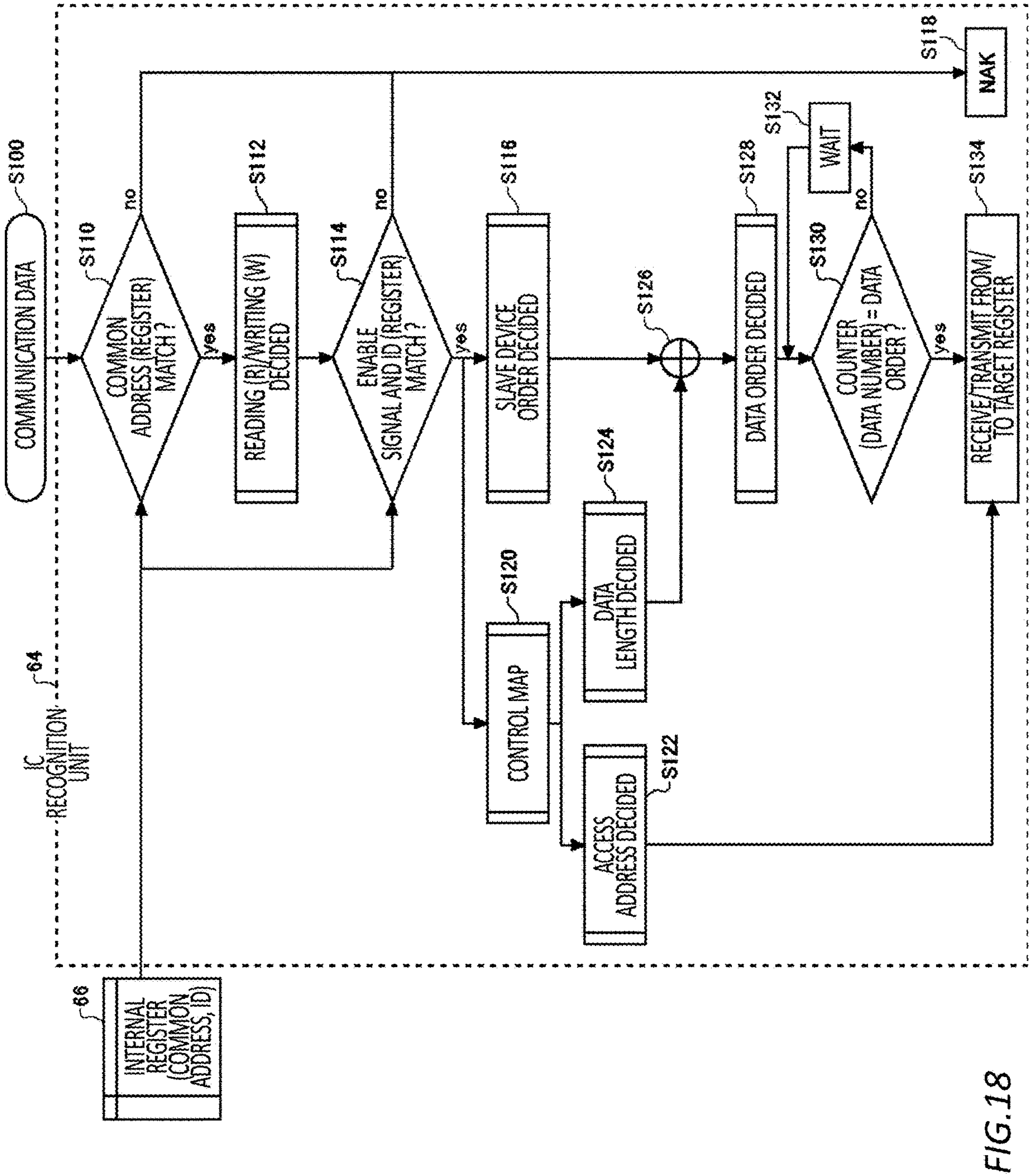
FIG. 18 is a diagram showing an example flowchart of the operation of an IC recognition unit 64 according to an embodiment.

FIG. 18 shows an example of the flowchart of the operation of the IC recognition unit 64 according to an embodiment. The operation performed by the IC recognition unit 64 is configured to include step S100 to step S134.

The slave device 32 receives communication data including the control signal from the master device 30 (step S100). Specifically, the communication data may be received by the transceiver unit 62 in the communication unit 60, starting from the input terminals 50 and 52. The transceiver unit 62 then transmits to the IC recognition unit 64 the part of the control signal indicating whether the slave device 32 is targeted for control.

Next, In the present embodiment, step S110 to step S134, which are the processes performed by the IC recognition unit 64, are described. The IC recognition unit 64 performs reading for the common address and ID of the slave device 32 from the internal register 66. The IC recognition unit 64 compares the common address bit from the part in the control signal indicating whether the slave device 32 is targeted for control to the common address read from the common address register 664 (step S110). The comparison result indicating that the contents match causes the process to proceed to step S112, while the comparison result indicating that the contents do not match causes the process to proceed to step S118.

The IC recognition unit 64 then decides whether to perform read processing or write processing on the internal register 66 in the slave device 32 based on the bits that are indicated before the common address bits and indicate which of the read (R) processing or write (W) processing to be performed (step S112). The IC recognition unit 64 then compares the bit indicating (enabling) the IC to be controlled (corresponding to an enable signal) indicated in the ADRS bits to the ID indicated in the common address register 664 to check whether they match (step S114). The comparison result indicating that the contents match causes the process to proceed to step S116, while the comparison result indicating that the contents do not match causes the process to proceed to step S118.

In step S110 or step S114, if the comparison result indicates no matching (NO), the IC recognition unit 64 returns a negative acknowledgment (NACK) in the recognition of whether the slave device 32 is targeted for control (step S118). With the negative acknowledgment (NACK) from the IC recognition unit 64, the processing of the slave device 32 in the control signal of the communication data communicated in step S100 ends. Therefore, the communication unit 60 does not perform data communication with the master device 30 if its own slave device is not selected in the specifying information in the control signal.

Furthermore, the IC recognition unit 64 refers to the reference table shown in FIG. 11 to identify the IDs of all the slave devices 32 targeted for data communication in the current control signal. The IC recognition unit 64 decides the order of control performed by the slave device 32 by arranging all the identified IDs in the ascending order and identifying the order of its own slave device's ID indicated in the internal register 66 (step S116). On the other hand, the IC recognition unit 64 reads the data length information from the low-order bits of the ADRS bits and compares the content of the data length information to the control map (step S120).

In this way, the IC recognition unit 64 decides the register address to be accessed in the register (step S122). The information about the register address to be accessed in this register is used in step S134. Furthermore, the IC recognition unit 64 decides the data length for processing on the register in the register address to be accessed (step S124). This information about the data length is used in step S126.

The IC recognition unit 64 sums the order of control performed by the slave device 32 and the data length for processing on the register (step S126). The IC recognition unit 64 performs the following calculation: (N−1)*the data length (the data order), wherein N is the order of the slave device 32. For example, if the order of the slave device 32 is "3", the IC recognition unit 64 adds two data lengths (calculates 2*the data length). In this way, the IC recognition unit 64 can decide the order and timing for the selected target slave device 32 among the plurality of slave devices performing data processing, that is, the order of data processing (data order) and the timing according to the order, in the clock indicated in the clock signal (step S128). In the case of read processing, the IC recognition unit 64 recognizes to wait for (N−1)*the data length (data order) after the ACK following the ADRS bits 94, access the specified register in the slave device 32, and read the data. In the case of write processing, the IC recognition unit 64 recognizes to wait for (N−1)*the data length (data order) after the ACK following the common address bits 166 and 176, where writing is specified in the first bit, access the register specified within the slave device 32, and write the data.

The IC recognition unit 64 counts the number of data in the clock by using a counter (not shown) and compares the number of data to the data order to determine whether they match (step S130). The number of data reaching the data order of the processing target causes the process to proceed to step S134, while the number of data not reaching the data order of the processing target causes the process to proceed to step S132.

When the number of data does not reach the data order of the processing target, the IC recognition unit 64 waits (step S132) and proceeds again to the process of comparing the number of data to the data order to determine whether they match (step S130).

At the timing when the number of data reaches the data order of the processing target, the IC recognition unit 64 accesses the register of the target register address of the slave device 32 based on the information of the register address accessed in the register and performs read processing or write processing of the data with a length of bytes specified in the data length decided in step S124 (step S134). In this way, the control information used in the actuator driving unit 80 is processed.

The operation of the IC recognition unit 64 is implemented with the process described above. In this way, the data communication method in the present embodiment is implemented.

Therefore, the operation of the IC recognition unit 64 can be implemented that can accommodate the control signal in which a plurality of ICs are targeted for control simultaneously and the signal length of the control signal is shortened to prevent pressure on the communication bandwidth.

While the present invention has been described by way of the embodiments, the technical scope of the present invention is not limited to the above-described embodiments. It is apparent to persons skilled in the art that various alterations or improvements can be made to the above-described embodiments. It is also apparent from the description of the claims that the embodiments to which such alterations or improvements are made can be included in the technical scope of the present invention.

Note that the order of execution of each process such as operations, procedures, steps, stages in the apparatus, system, program, and method shown in the claims, specification, and diagrams can be realized in any order as long as the order is not specifically indicated by "prior to," "before," or the like and also as long as the output from a previous process is not used in a later process. Even if the operational flow is described by using phrases such as "first" or "next" in the claims, specification, or diagrams for convenience, it does not necessarily mean that the process must be performed in this order.

EXPLANATION OF REFERENCES

10: imaging device;
12: camera;
14: base (substrate);
16, 26: substrate;
18, 44: image sensor;
20, 30: master device;
22, 32: slave device;
24, 28: bit sequence;
31, 60: communication unit;

34: other slave device;
40: imaging unit;
42, 120: optical system;
46: driving unit;
50, 52: input terminal;
54, 56: output terminal;
62: transceiver unit;
64: IC recognition unit;
66: internal register;
68: non-volatile memory;
70: position sensor;
72: amplifier;
74: ADC;
80: actuator driving unit;
82: control unit;
84: DAC;
86: first driver;
88: second driver;
90, 130, 140, 150, 160, 170: control signal;
92, 132, 142, 152, 162, 166, 172, 176: common address bit;
94, 134, 144, 154, 164, 174: ADRS bit;
96, 168, 178: data;
100: user terminal;
121, 123, 125: voice coil motor;
122, 124, 126, 460, 464: air core coil;
127, 128, 129: IC chip;
200: communication system;
260, 263, 266, 462, 466: magnet;
660: target position register;
662: operation mode register;
664: common address register;
942: high-order bit;
944: low-order bit.

What is claimed is:

1. A slave device that performs data communication with a master device via a bus, comprising:

a communication unit comprising:

one or more internal registers including at least a common address register, wherein the slave device is configured to work as part of a group of slave devices that include the slave device and one or more other slave devices that collectively define a plurality of slave devices, wherein the common address register is configured to at least store a common address for the plurality of slave devices, and wherein the slave device is configured for send/receive access to the bus independent of the other slave devices; and an IC recognition unit configured to determine if a control signal transmitted from the master device has the slave device as a target, wherein the communication unit receives the control signal, transmitted from the master device, the control signal including address information indicating the common address for the plurality of slave devices, specifying information specifying at least one slave device, among the plurality of slave devices, targeted for data communication, and data length information indicating a data length that a slave device specified in the specifying information receives or transmits in a predetermined order, and, in response to the specifying information in which its own slave device is not selected, determines not to communicate with the master device, and, in response to the specifying information in which the slave device is selected, reads or writes data with a data length indicated in the data length information from/to a register of the slave device according to the specifying information and performs data communication with the master device at a timing according to the predetermined order, wherein the specifying information appears in the control signal, the specifying information has a first bit sequence that includes a plurality of bits, each of the plurality of slave devices is assigned a unique one of the plurality of bits of the first bit sequence such that each of the plurality of bits of the first bit sequence corresponds to at least one of the plurality of slave devices, one or more of the plurality of slave devices being targeted for data communication when the corresponding one of the plurality of bits of the first bit sequence for each of the one or more of the plurality of slave devices is set to a first value by the master device, and the IC recognition unit is configured to determine if the slave device is targeted for data communication by checking the bit corresponding to the slave device in the first bit sequence and determining that the slave device is targeted for data communication when the bit corresponding to the slave device in the first bit sequence is set to the first value.

2. The slave device according to claim 1, wherein the predetermined order is uniquely assigned to each of the plurality of slave devices, and the communication unit:

receives or transmits data with a data length indicated in the data length information according to the predetermined order and the specifying information when the bit in the first bit sequence assigned to the slave device has the first value; and determines that the slave device is not targeted for data communication when the bit in the first bit sequence assigned to the slave device has a second value.

3. The slave device according to claim 1, wherein the address information includes a first bit indicating whether the slave device should read or write data, and the communication unit determines whether the slave device should read or write data based on the first bit.

4. The slave device according to claim 1, wherein the data length information has a second bit sequence corresponding to a register address of the slave device and a data length to/from which the slave device should read or write data, and the communication unit:

refers to a map indicating a relationship between the second bit sequence and the register address and the data length of the slave device to/from which the slave device should read or write data and thereby identifies the register address and the data length of the slave device to/from which the slave device should read or write data corresponding to the second bit sequence included in the data length information, and accesses the register address of the slave device to/from which the slave device should read or write data and thereby receives or transmits data with a data length indicated in the data length information according to the predetermined order and the specifying information when the slave device is targeted for data communication.

5. The slave device according to claim 1, wherein the predetermined order is uniquely assigned to each of the plurality of slave devices, the address information includes a first bit indicating whether the slave device should read or write data, the data length information has a second bit sequence corresponding to a register address and a data length of the slave device to/from which the slave device should read or write data, and the communication unit:

determines whether the slave device should read data from the register or write data to the register based on the first bit;

determines that the slave device is targeted for data communication when the address information indicates the common address and the slave device is assigned to a bit having a first value among the first bit sequence;

determines that the slave device is not targeted for data communication when the address information indicates the common address and the bit assigned to the slave device in the first bit sequence has a second value;

refers to a map indicating a relationship between the second bit sequence and the register address and the data length of the slave device to/from which the slave device should read or write data and thereby identifies the register address and the data length of the slave device to/from which the slave device should read or write data corresponding to the second bit sequence included in the data length information when the slave device is targeted for data communication; and accesses the register address of the slave device to/from which the slave device should read or write data and thereby receives or transmits data with a data length indicated in the data length information according to the predetermined order and the specifying information when the slave device is targeted for data communication.

6. The slave device according to claim 1, wherein the address information indicates the common address or an individual address uniquely identifying each of the plurality of slave devices, when the address information indicates the individual address, the control signal includes register information indicating a register address of a slave device to/from which the slave device targeted for data communication corresponding to the individual address should read or write data instead of the specifying information and the data length information, and when the address information indicates the individual address of the slave device, the communication unit accesses the register address of the slave device indicated in the register information and thereby performs data communication with the master device to read or write data.

7. The slave device according to claim 1, wherein the slave device performs data communication with the master device in an I2C communication method.

8. The slave device according to claim 1, wherein the slave device is an IC chip.

9. A communication system comprising:

the plurality of slave devices according to claim 1; and the master device that transmits the control signal to the plurality of slave devices via the bus.

10. An imaging device comprising:

the communication system according to claim 9; and a plurality of imaging units having an optical system, an image sensor that captures an image formed via the optical system, and a driving unit that drives at least one of the optical system or the image sensor, wherein each of the plurality of slave devices drives at least one of the optical system or the image sensor of its own by controlling the driving unit of its own according to the data of its own.

11. An imaging device comprising:

the communication system according to claim 9; and an imaging unit having an optical system, an image sensor that captures an image formed via the optical system, and a driving unit that drives at least one of the optical system or the image sensor, wherein each of the plurality of slave devices drives at least one of the optical system or the image sensor by controlling the driving unit according to the data of its own.

12. A master device that performs data communication with a plurality of slave devices via a bus, comprising:

a communication unit that transmits a control signal, which includes address information indicating a common address for a plurality of slave devices, specifying information specifying one or more selected slave devices, among the plurality of slave devices, targeted for data communication, and data length information indicating a data length that a slave device specified in the specifying information receives or transmits in a predetermined order, to the plurality of slave devices via the bus and thereby performs data communication with the one or more selected slave devices, among the plurality of slave devices, that are targeted for data communication, wherein the specifying information appears in the control signal, the specifying information has a first bit sequence that includes a plurality of bits, each of the plurality of slave devices is assigned a unique one of the plurality of bits of the first bit sequence such that each of the plurality of bits of the first bit sequence corresponds to at least one of the plurality of slave devices, and each of the one or more selected slave devices, of the plurality of slave devices, being targeted for data communication has a corresponding bit of the plurality of bits of the first bit sequence that is set to a first value by the master device in order to select the one or more selected slave devices for data communication with the master device.

13. A data communication method for data communication between a master device and a plurality of slave devices via a bus, comprising:

receiving, by the plurality of slave devices, a control signal, which includes address information indicating a common address for the plurality of slave devices, specifying information specifying one or more selected slave devices, among the plurality of slave devices, targeted for data communication, and data length information indicating a data length that each of the one or more selected slave devices specified in the specifying information receives or transmits in a predetermined order, from the master device;

in response to the specifying information in which one of plurality of slave devices is not selected, which is termed a non-selected slave device, having the non-selected slave device not perform data communication with the master device; and the one or more selected slave devices selected in response to the specifying information to be targeted for data communication, performing, by each of the one or more selected slave devices, data communication with the master device to read data with a data length indicated in the data length information from a register of each of the one or more selected slave devices or to write data to the register according to the predetermined order and the specifying information based on the control signal, wherein the specifying information appears in the control signal, the specifying information has a first bit sequence that includes a plurality of bits, each of the plurality of slave devices is assigned a unique one of the plurality of bits of the first bit sequence such that each of the plurality of bits of the first bit sequence corresponds to at least one of the plurality of slave devices, and each of the one or more selected slave devices, of the plurality of slave devices, being targeted for data communication has a corresponding bit of the plurality of bits of the first bit sequence that is set to a first value by the master device in order to select the one or more selected slave devices for data communication with the master device.

14. The data communication method according to claim 13, wherein a predetermined order is uniquely assigned to each of the plurality of slave devices, and the data communication method further includes:

receiving or transmitting data with a data length indicated in the data length information according to the predetermined order and the specifying information when the bit in the first bit sequence assigned to the slave device has the first value; and determining that the slave device is not targeted for data communication when the bit in the first bit sequence assigned to the slave device has a second value.

15. The data communication method according to claim 13, wherein the address information includes a first bit indicating whether the slave device should read or write data, and the data communication method further includes:

determining whether each of the one or more selected slave devices should read or write data based on the first bit.

16. The data communication method according to claim 13, wherein the data length information has a second bit sequence corresponding to a register address and a data length of each of the one or more selected slave devices to/from which each of the one or more selected slave devices should read or write data, and the data communication method further includes:

referring to a map indicating a relationship between the second bit sequence and the register address and the data length of each of the one or more selected slave devices to/from which each of the one or more selected slave devices should read or write data and thereby identifying the register address and the data length of each of the one or more selected slave devices to/from which each of the one or more selected slave devices should read or write data corresponding to the second bit sequence, and accessing the register address of each of the one or more selected slave devices to/from which the slave device should read or write data and thereby receiving or transmitting data with a data length indicated in the data length information according to the predetermined order and the specifying information when each of the one or more selected slave devices is targeted for data communication.

17. The data communication method according to claim 13, wherein a predetermined order is uniquely assigned to each of the plurality of slave devices, the address information includes a first bit indicating whether each of the one or more selected slave devices should read or write data, the data length information has a second bit sequence corresponding to a register address and a data length of each of the one or more selected slave devices to/from which each of the one or more selected slave devices should read or write data, and the data communication method further includes:

determining whether each of the one or more selected slave devices should read data from the register or write data to the register based on the first bit;

determining that each of the one or more selected slave devices is targeted for data communication when the address information indicates the common address and the corresponding bit assigned to each of the one or more selected slave devices from among the plurality of bits of the first bit sequence has the first value;

determining that one or more of the plurality of slave devices are not targeted for data communication when the address information indicates the common address and the corresponding bit assigned to each of the one or more of the plurality of slave devices that are not targeted has a second value;

referring to a map indicating a relationship between the second bit sequence and the register address and the data length of each of the one or more selected slave devices to/from which each of the one or more selected slave devices should read or write data and thereby identifying the register address and the data length of each of the one or more selected slave devices to/from which each of the one or more selected slave devices should read or write data corresponding to the second bit sequence included in the data length information when each of the one or more selected slave devices is targeted for data communication, and accessing the register address of each of the one or more selected slave devices to/from which each of the one or more selected slave devices should read or write data and thereby receiving or transmitting data with a data length indicated in the data length information according to the predetermined order and the specifying information when each of the one or more selected slave devices is targeted for data communication.

18. The data communication method according to claim 13, wherein the address information indicates the common address or an individual address uniquely identifying each of the plurality of slave devices, when the address information indicates the individual address, the control signal includes register information indicating a register address of a slave device to/from which the slave device targeted for data communication corresponding to the individual address should read or write data instead of the specifying information and the data length information, and the data communication method further includes accessing the register address of the slave device indicated in the register information and thereby performing data communication with the master device to read or write data when the address information indicates the individual address of the slave device.

19. The data communication method according to claim 13, wherein the slave device performs data communication with the master device in an I2C communication method.

20. The data communication method according to claim 13, wherein the slave device is an IC chip.

* * * * *